(12) United States Patent
Lugiai et al.

(10) Patent No.: US 10,135,700 B2
(45) Date of Patent: *Nov. 20, 2018

(54) ENTERPRISE APPLICATION INTEGRATION ON CLIENT COMPUTING DEVICES

(71) Applicant: Softphone SRL, Milan (IT)

(72) Inventors: Alan Lugiai, Brembate di Sopra (IT); Francesco Falanga, Mercogliano (IT); Bartolomeo Sorrentino, Milan (IT)

(73) Assignee: Softphone SRL, Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,495

(22) Filed: Jan. 12, 2018

(65) Prior Publication Data
US 2018/0139111 A1    May 17, 2018

Related U.S. Application Data

(63) Continuation-in-part of application No. 15/179,783, filed on Jun. 10, 2016, now Pat. No. 9,888,118, which is a continuation-in-part of application No. 15/094,510, filed on Apr. 8, 2016, now Pat. No.
(Continued)

(51) Int. Cl.
*H04L 12/24* (2006.01)
*H04L 29/08* (2006.01)

(52) U.S. Cl.
CPC ........ *H04L 41/5064* (2013.01); *H04L 67/141* (2013.01); *H04L 67/36* (2013.01)

(58) Field of Classification Search
CPC ........... H04L 12/5835; H04L 29/06027; H04L 41/5064; H04L 51/066; H04L 65/1053;
(Continued)

(56) References Cited

U.S. PATENT DOCUMENTS 9,325,584 B2 *   4/2016   Lugiai .................. H04L 67/141
9,686,155 B2 *   6/2017   Lugiai ................. H04L 41/5064
(Continued)

OTHER PUBLICATIONS

U.S. Notice of Allowance on U.S. Appl. No. 14/202,865 dated Mar. 21, 2016.
(Continued)

*Primary Examiner* — Harry S Hong
(74) *Attorney, Agent, or Firm* — Foley & Lardner LLP; James De Vellis

(57) ABSTRACT

Systems and methods of facilitating computer telephone integration between customer relationship management (CRM) applications on client computing devices in a contact center environment are provided. A client computing device in the contact center environment can include a processor and memory. The client computing device can have a user workstation including a contact toolbar application and a CRM application to provide computer telephony integration data for display by the client computing device. The contact toolbar application can provide a connection point within the user workstation. The user workstation can establish an integration channel over a data network via the connection point between the contact toolbar application and the CRM application for real time exchange of the computer telephony integration data between the contact toolbar application and the CRM application.

20 Claims, 26 Drawing Sheets

Related U.S. Application Data 9,686,155, which is a continuation of application No. 14/202,865, filed on Mar. 10, 2014, now Pat. No. 9,325,584.

(60) Provisional application No. 62/508,828, filed on May 19, 2017.

(58) Field of Classification Search
CPC ... H04L 65/1073; H04L 67/36; H04L 67/141; H04M 3/5183
USPC ....... 379/265.01–265.14; 709/202, 203, 205, 709/227, 242, 243, 245, 246
See application file for complete search history.

(56) References Cited

U.S. PATENT DOCUMENTS

| | | | |
|---|---|---|---|
| 9,888,118 B2 * | 2/2018 | Lugiai | H04M 3/5183 |
| 2002/0038309 A1 | 3/2002 | Perkins et al. | |
| 2012/0029901 A1 | 2/2012 | Nielsen | |
| 2012/0185229 A1 | 7/2012 | Perrett | |
| 2015/0003595 A1 * | 1/2015 | Yaghi | G06Q 10/063 379/85 |

OTHER PUBLICATIONS

U.S. Notice of Allowance on U.S. Appl. No. 15/094,510 dated May 10, 2017.

U.S. Notice of Allowance on U.S. Appl. No. 15/179,783 dated Sep. 25, 2017.

U.S. Office Action on U.S. Appl. No. 14/202,865 dated Nov. 5, 2015.

U.S. Office Action on U.S. Appl. No. 15/094,510 dated Dec. 19, 2016.

U.S. Office Action on U.S. Appl. No. 15/179,783 dated Mar. 17, 2017.

* cited by examiner

ENTERPRISE APPLICATION INTEGRATION ON CLIENT COMPUTING DEVICES

CROSS-REFERENCE TO RELATED APPLICATIONS

The present application claims priority under 35 U.S.C. § 119 to U.S. Provisional Patent Application 62/508,828, filed May 19, 2017 and titled "ENTERPRISE APPLICATION INTEGRATION ON CLIENT COMPUTING DEVICES," and the present application claims priority under 35 U.S.C. § 120 as a continuation-in-part to U.S. patent application Ser. No. 15/179,783, filed Jun. 10, 2016 and titled "ENTERPRISE APPLICATION INTEGRATION ON CLIENT COMPUTING DEVICES," which is a continuation-in-part of U.S. patent application Ser. No. 15/094,510, filed Apr. 8, 2016 and titled "ENTERPRISE APPLICATION INTEGRATION ON CLIENT COMPUTING DEVICES" that issued as U.S. Pat. No. 9,686,155 on Jun. 20, 2017, which is a continuation of U.S. patent application Ser. No. 14/202,865, filed Mar. 10, 2014, titled "ENTERPRISE APPLICATION INTEGRATION ON CLIENT COMPUTING DEVICES," and that issued as U.S. Pat. No. 9,325,584 on Apr. 26, 2016, each of which is incorporated herein by reference in its entirety.

BACKGROUND

Computing devices can have applications that communicate via a computing network with remote servers to obtain data and provide the data for display by the computing devices. The applications can use different operating systems or be associated with different host servers.

SUMMARY

At least one aspect is directed to a system of facilitating computer telephony integration between customer relationship management (CRM) applications on client computing devices in a contact center environment. The system can include a client computing device in the contact center environment. The client computing device can include a processor and memory. The client computing device can have a user workstation including a contact toolbar application and a CRM application to provide computer telephony integration data for display by the client computing device. The contact toolbar application can execute on the client computing device to provide a connection point within the user workstation. The connection point can include at least one of a hypertext transfer protocol (HTTP) endpoint and an internet address. The user workstation can establish an integration channel over a data network via the connection point between the contact toolbar application and the CRM application for real time exchange of the computer telephony integration data between the contact toolbar application and the CRM application.

At least one aspect is directed to a method of facilitating computer telephony integration between customer relationship management (CRM) applications on client computing devices in a contact center environment. The method can include executing, by a client computing device having a user workstation in the contact center environment, a contact toolbar application and a CRM application to provide computer telephony integration data for display by the client computing device. The method can include providing, by the contact toolbar application, a connection point within the user workstation. The connection point can include at least one of a hypertext transfer protocol (HTTP) endpoint and an internet address. The method can include establishing, by the user workstation, an integration channel over a data network via the connection point between the contact toolbar application and the CRM application for real time exchange of the computer telephony integration data between the contact toolbar application and the CRM application.

At least one aspect is directed to a system of contact center data integration with customer relationship management (CRM) applications on client computing devices in contact center environments. A workspace routing connector application can be executed by an enterprise server of a contact center enterprise or by a computing device of a different enterprise, responsive to an actuation command received by the workspace routing connector application from, for example, the computing device of the different enterprise to integrate the contact center enterprise with the different enterprise. A configuration component of the workspace routing connector application can execute to select a contact center parameter from the contact center enterprise server. The workspace routing connector application can include or display a graphical user interface, and the workspace routing connector application can executes to display, in the graphical user interface, an available CRM application and a CRM script based on the contact center parameter, and can execute to receive an indication of selection of at least one of the CRM script and the CRM application. Responsive (e.g., subsequent) to the selection of the CRM script or the CRM application, the CRM script can execute to provide, from at least one of the contact center enterprise server and the workspace routing connector application, via a computer network, for display by a client computing device in a contact center environment, contact center data related to the contact center parameter.

At least one aspect is directed to a method of contact center data integration with customer relationship management (CRM) applications on client computing devices in contact center environments. The method can execute a workspace routing connector application, responsive to an actuation command received by the workspace routing connector application from a computing device, to integrate the contact center enterprise with a different enterprise. The method can select, by a configuration component of the workspace routing connector application, a contact center parameter from a contact center enterprise server. The method can provide, by the workspace routing connector application for display in a graphical user interface, an available CRM application and a CRM script based on the contact center parameter. The method can receive, by the workspace routing connector application, an indication of selection of at least one of the CRM script and the CRM application. The method can execute the CRM script, responsive to the selection, to provide for display by a client computing device in a contact center environment, contact center data related to the contact center parameter.

At least one aspect is directed to a computer readable storage device storing instructions that when executed by one or more data processors, cause the one or more data processors to perform operations for contact center data integration with customer relationship management (CRM) applications on client computing devices in contact center environments. The operations can include executing a workspace routing connector application, responsive to an actuation command received by the workspace routing connector application from a computing device via a computer network, to integrate the contact center enterprise with the different enterprise. The operations can include selecting, by a configuration component of the workspace routing connector application, a contact center parameter from a contact center enterprise server. The operations can include providing, by the workspace routing connector application for display in a graphical user interface, an available CRM application and a CRM script based on the contact center parameter. The operations can include receiving, by the workspace routing connector application, an indication of a selection of at least one of the CRM script and the CRM application. The operations can include executing the CRM script, responsive to the selection, to provide via the workspace routing connector application, for display by a client computing device in a contact center environment, contact center data related to the contact center parameter.

At least one aspect is directed to a system of facilitating computer telephony integration between customer relationship management (CRM) applications on client computing devices in a contact center environment. A client computing device in the contact center environment can include a user workstation. The user workstation can include a contact toolbar application, a first CRM application, and a second CRM application to provide computer telephony integration data for display by the client computing device. The contact toolbar application can execute on the client computing device to publish a connection point within the user workstation. The client computing device can execute a connector plugin of the first CRM application to identify the connection point and to establish a first connection with the connection point. The client computing device can execute a connector plugin of the second CRM application to identify the connection point and to establish a second connection with the connection point. The user workstation can establish an integration channel via the connection point between the contact toolbar application, the first CRM application, and the second CRM application, for real time exchange of computer telephony integration data between the contact toolbar application and at least one of the first CRM application and the second CRM application.

At least one aspect is directed to a computer implemented method of facilitating interaction between customer relationship management (CRM) applications in a contact center environment on a client computing device having a user workstation. The user workstation can include a contact toolbar application, a first CRM application, and a second CRM application. The method can execute the contact toolbar application of the client computing device to publish a connection point within the user workstation of the client computing device. The method can execute, by the client computing device, a connector plugin of the first CRM application to identify the connection point and to establish a first connection between the first CRM application and the contact toolbar application via the connection point, and can execute, by the client computing device, a connector plugin of the second CRM application to identify the connection point and to establish a second connection between the first CRM application and the contact toolbar application via the connection point. The method can establish, by the user workstation, an integration channel via the connection point between the contact toolbar application, the first CRM application, and the second CRM application, for real time exchange of computer telephony integration data between the contact toolbar application and at least one of the first CRM application and the second CRM application.

At least one aspect is directed to a computer readable storage device storing instructions that when executed by one or more data processors, cause the one or more data processors to perform operations for interaction between client applications on a client computing device having a user workstation, the user workstation including a contact toolbar application, a first CRM application, and a second CRM application. The operations can include executing the contact toolbar application of the client computing device to publish a connection point within the user workstation of the client computing device, and executing, by the client computing device, a connector plugin of the first CRM application to identify the connection point and to establish a first connection between the first CRM application and the contact toolbar application via the connection point. The operations can include executing, by the client computing device, a connector plugin of the second CRM application to identify the connection point and to establish a second connection between the first CRM application and the contact toolbar application via the connection point. The operations can include establishing, by the user workstation, an integration channel via the connection point between the contact toolbar application, the first CRM application, and the second CRM application, for real time exchange of computer telephony integration data between the contact toolbar application and at least one of the first CRM application and the second CRM application.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

Figure 9:
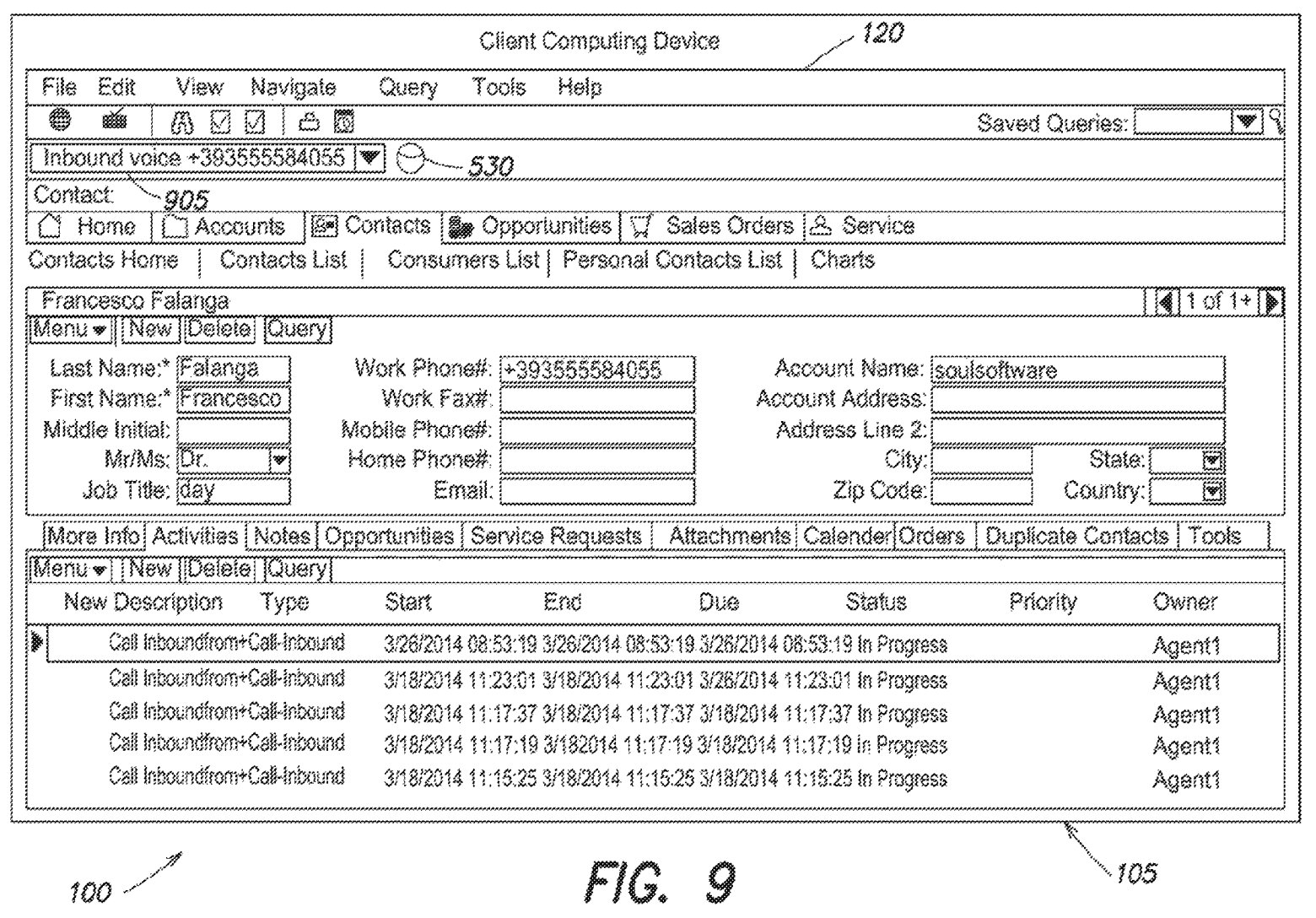

FIG. 9 is a display depicting one example of a client application on a client computing device, according to an illustrative implementation;

FIG. 25 is a block diagram depicting an example display environment 2500 for client application interaction on a client computing device, according to an illustrative implementation.

DETAILED DESCRIPTION

Figure 1:
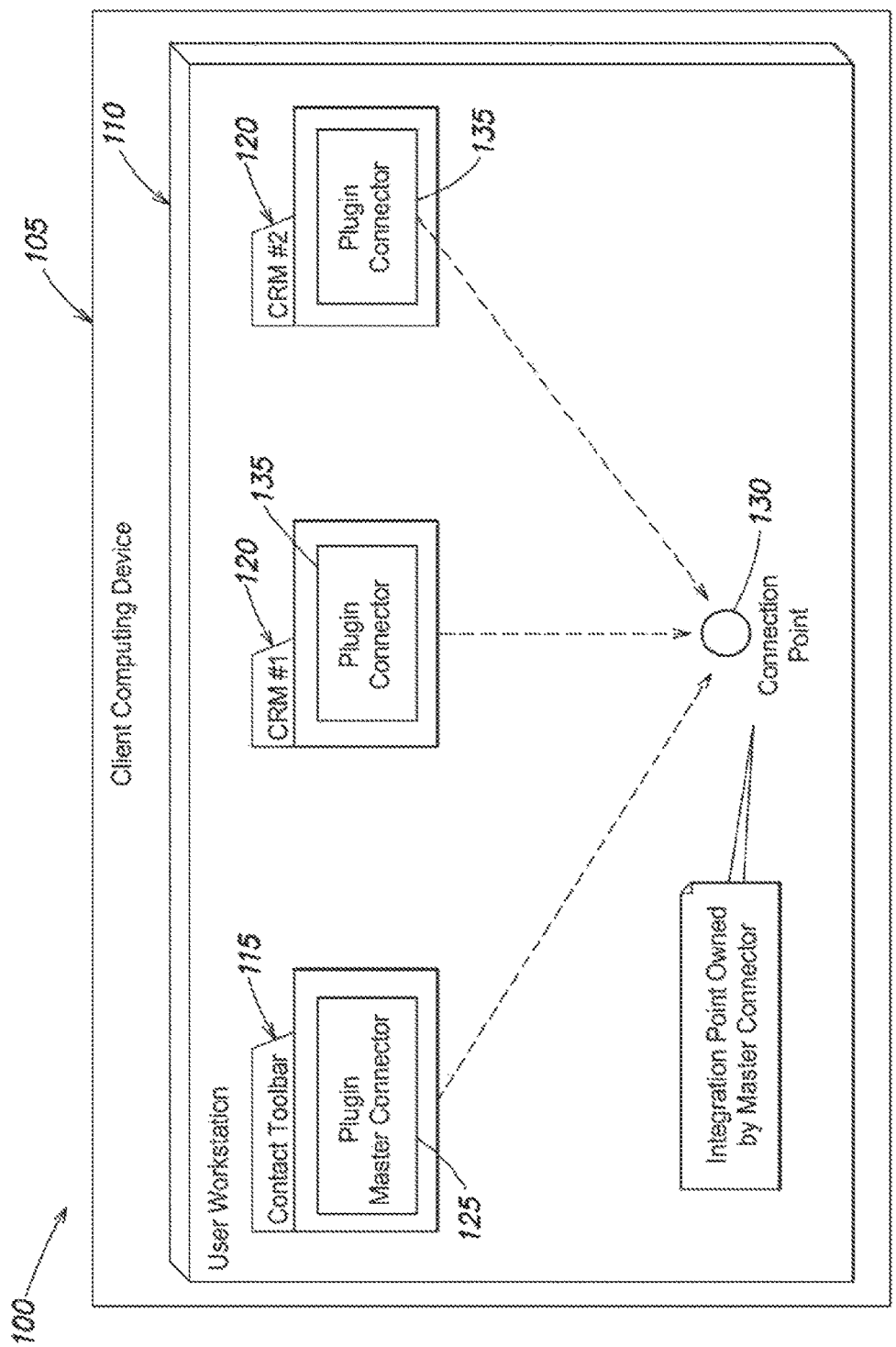
FIG. 1 is a block diagram depicting one example environment for client application interaction on a client computing device, according to an illustrative implementation.

Following below are more detailed descriptions of various concepts related to, and implementations of, methods, apparatuses, and systems of providing information via a computer network. The various concepts introduced above and discussed in greater detail below may be implemented in any of numerous ways, as the described concepts are not limited to any particular manner of implementation.

Customer Relationship Management (CRM) applications can manage interactions between a company and their customers over various contact channels, such as email, or instant messaging communications channels. Contact centers such as call centers can access or coordinate between multiple CRM applications. The CRM applications can evaluate the data collected via the various contact channels to create or provide information about customers. For example, a contact center on behalf of a business entity can include or aggregate data from customer contacts via multiple channels to create a robust profile of clients. This data can be used for client relationship, customer support, marketing research, or other purposes.

The contact center can include a number of agent or user workstations such as client computing devices connected to the internet or other communication network to communicate with customer computing devices, for example via telephone, voice over internet protocol, short message service, instant message, or other mode of communication to manage data of various customers. For example, an operator of a client computing device in a call center can receive a call from a customer via the client computing device and also retrieve other data about that customer based on previous interactions, such as information about a pending customer order or service request, e.g., during the call.

Different CRM applications that execute on one client computing device (or execute on a server and display output on one client computing device) may exchange data with each other in various ways. For example, the CRM applications may be client-server or web based applications so that the exchange of information between two or more CRM applications includes a server to server communication of the exchanged data between a server associated with the first CRM application and a server associated with a second CRM. A new user interface can be created on the client computing device to display the data received from the servers of the different CRM applications. This data can be provided for display by the client computing device via the internet or other computer network.

Systems and methods of the present disclosure relate generally to computer telephony integration of multiple CRM applications by a client computing device. The CRM applications can be different applications, provided for example by different vendors. Different CRM applications can include different information about customers and can execute on or display output data on the client computing device.

To facilitate communication between different CRM applications on, for example, a single client computing device in a contact center environment, the client computing device can be provided with a contact toolbar application. The contact toolbar application can execute on the client computing device to publish, on the client computing device, a connection point. Multiple CRM applications executing on or providing data to the client computing device can identify this connection point and can each establish a connection with the connection point. The connections establish an integration channel that connects, on the client computing device, the contact toolbar application with the CRM applications, and connects the CRM applications with each other.

The integration channel provides a communication channel on the client computing device that integrates the contact toolbar, or other computer telephony integration application, with CRM or other enterprise applications and provides for client side communication between these applications on the client computing device to, for example, retrieve customer data about a customer while receiving (or during) a telephone call with that customer. In this example, rather than server to server communication, the contact toolbar and the CRM applications can communicate with each other via the integration channel, for example to exchange real time events or data, within the client computing device. This exchanged data can be retrieved by the contact toolbar from its corresponding server, or can be retrieved by the CRM application from its corresponding server. However the exchange of data between the contact toolbar and the CRM application can occur on the client side via the integration channel and not via any server side communication channel between the respective servers. Thus, the systems and methods described herein can provide a client-based bi-directional multi-session event based communication protocol to allow intra-client communication between CRM applications and the contact toolbar application via the integration channel.

In addition to client side intra-CRM application communications, the systems and methods of the present disclosure relate generally to contact center data (e.g., computer telephony data) integration with CRM applications. For example, a company or other enterprise can use or otherwise integrate with a (different) contact center enterprise to provide contact center services to the company. To achieve the integration, a workspace routing connector application can be launched. The workspace routing connector application can include or implement a routing strategy to route identified parameters from the contact center enterprise to a CRM application. The parameters can include information such as phone numbers, email address, chat names, usernames, or caller identifications, and can be included in a CRM script.

The CRM script can be selected, within the workspace routing connector application, and used to call the relevant parameter information from the contact center enterprise. This information can be provided from the contact center enterprise to a client computing device (or a user workstation thereof) for display to a contact center agent of the other company or enterprise. The CRM script can be edited, e.g., by a technology administrator of the company or other enterprise, to add or remove parameters so that the CRM script can be repeatedly used to call different parameters from one or more enterprise servers of the contact center enterprise. In this example, the technology administrator interfaces with the CRM script from the company side by identifying different parameters, rather than from the contact center enterprise side. This avoids, for example, a need for a technology administrator to directly or manually program varying contact center programs that may be in different formats unfamiliar to the technology administrator. Thus, the workspace routing connector application that generates the CRM script can be used to automatically interface with contact center enterprise servers to provide information to one or more CRM applications.

This disclosure also describes techniques for integrating CRM applications or other applications with one another in an environment on a user workstation. The integration can allow for exchange of data between CRM applications or other applications at, for example, the user workstation for display to an agent in a contact center. For example, multiple CRM applications or other applications can be displayed in a browser based environment. The technological solution described herein can organize, order, move, locate, position, or otherwise manipulate the juxtaposition of multiple CRM applications or other applications, so that the applications when displayed in a browser environment do not overlap, block, disrupt, or interfere with one another. The ordering or controlled display of the applications within the browser-based user workstation environment prevents obstruction of one application by another application when displayed in the browser-based environment from the user workstation to the contact center agent.

The applications that are displayed in this controlled manner to avoid overlapping display windows or multiple browser tabs can include integrated client-side CRM applications or other applications that can communicate with each other via an intra-client computing device communication via a client side integration channel to share data as described above, rather than in a server-to-server manner. The controlled and ordered display of applications within the user workstation can improve or optimize the amount and type of data that can be simultaneously displayed, for example, via a browser-based interface executing at a user workstation of a client computing device, and can prevent the various applications from overlapping or otherwise obstructing each other. These and other aspects of the disclosure are described further below.

FIG. 1 illustrates an example environment 100 for client application interaction on a client computing device 105. The environment 100 may include a call center or other contact center having a number of client computing devices 105 to manage customer interaction via CRM applications, or to manage supply chain, inventory, shipping, or other types of applications such as human resources or employee benefit (e.g., healthcare) data for a business.

The client computing devices 105 can include computing devices to execute or communicate with CRM applications to access or provide computer telephony data integration with CRM applications, for example as part of an enterprise application integration framework. The client computing devices 105 can include desktop computers, laptop computers, tablet computers, smartphones, personal digital assistants, thin client computing devices, virtual computing devices, mobile devices, end user computing devices, consumer computing devices, clients, and other computing devices. The client computing devices 105 can include user interfaces such as microphones, speakers, touchscreens, keyboards, pointing devices, a computer mouse, touchpad, or other input or output interfaces. The client computing devices 105 can execute or display the results of CRM or other applications and can provide for the real time exchange of telephony integration data between CRM or other applications within the client computing device 105, e.g., in the absence of a server to server exchange of the telephony integration data between servers associated with respective CRM or other applications.

The client computing device 105 can include at least one user workstation 110. In some implementations the client computing device 105 is the agent workstation 110, however the user workstation 110 can also include a virtual machine or virtual client device isolated from the remainder of the client computing device 105. The user workstation 110 can include at least one processor (e.g., of the client computing device 105) to execute CRM or other applications. In some implementations, an operator of the client computing device 105 can logon to access the user workstation 110.

The user workstation 110 can include at least one contact toolbar application 115 and at least one CRM application 120. For example, in a call center or other contact center environment, the client computing device 105 can execute the contact toolbar application 115 to receive, accept, or manage a customer request such as a phone call. The contact toolbar application 115 may include a script and can display telephone call or other data in an interface of the client computing device 105.

The contact toolbar application 115 can execute to accept incoming customer communication requests via various communication channels. For example, the client computing device 105 can communicate with the networks such as the internet, local area, wide area, satellite, telephone, or hybrid communication networks, and the contact toolbar application 115 can accept a phone call, voice over internet protocol communication, chat, short message service, instant message service, email, fax, or other communication from a customer via those networks. The contact toolbar application 115 can acquire contact or other identifying information of the customer such as a name, username, logon information, or password, for example. This information can be received from the customer during a call, or can be retrieved from a database associated with the client computing device 105. In, for example, a contact center environment, the contact toolbar application 115 manages customer contact interaction. The contact toolbar application 115 can indicate a call or message from a customer and allows for persistent bi-directional communication with a customer, from the client computing device 105.

In some implementations, the contact toolbar application 115 provides a display in a user interface of the client computing device 105. The operator of the client computing device 105 can provide a username, password, or other details into the interface to logon to the contact toolbar application 115. For example, in a call center environment, the operator can logon to the contact toolbar application 115 to obtain customer information such as a customer identification, or customer interaction information such as historical data pertaining to that customer (e.g., call history data). The contact toolbar application 115 can execute on the client computing device 105 to perform answer or hang-up interactions to initiate or terminate a call with a customer, and can include record, pause, resume, or forward operations to control the communication with the customer. The contact toolbar application 115 can allow the operator (e.g., user) to attach information to a record of the call such as notes of the call or other information about the customer. The contact toolbar application 115 can include a script in an extensible format, language or protocol designed to accommodate the addition of hooks, application programming interfaces, or plugins to allow the provide additional functionality such as the ability establish client-side communication channels on the client computing device 105 to communicate with at least one CRM application 120.

The CRM applications 120 can include various customer relationship applications for managing a company's interactions with current, future or potential customers. A business or other organization can use the CRM applications 120 to organize, automate, synchronize, or otherwise process data related to employees, customers, or potential customers of the organization. For example, the CRM applications 120 can be used to process employee or customer data related to sales, marketing, customer service, or technical support. In some implementations, the CRM applications 120 are server side applications that, for example, are specialized for a market segment. Data from the CRM applications 120 can be provided for display in a user interface of the client computing device 105 via the internet or other network communication such as an intranet. The CRM applications 120 can include (e.g. in an associated database) or access information about customer interactions and provide or make this data available to the contact toolbar application 115.

To enable, for example, direct client-side communication between the contact toolbar application 115 and at least one CRM application 120, the contact toolbar application 115 can include at least one master connector plugin 125. The master connector plugin 125 can include a software component that can acts as an extension or add-on of the contact toolbar application 115 to facilitate client side asynchronous bi-directional communication between the contact toolbar application 115 and the CRM applications 120. For example, the computer telephony data can be transmitted intermittently through these components rather than in a steady or continuous stream. The bi-directional communication or integration between the contact toolbar application 115 and the CRM applications 120 can occur within the client computing device 105 (or within the user workstation 110), for example in the absence of intervening servers in the communication path between the contact toolbar application 115 and the CRM applications 120. The master connector plugin 125 can include script or code such as C#, C++, Java, or java script.

The master connector plugin 125 can execute on the client computing device 105, e.g., within the contact toolbar application 115, to publish at least one connection point 130 such as an http endpoint or internet address. The connection point 130 can provide or include a shared public channel on the client computing device 105, published by the master connector plugin 125 to allow client side connection and communication between the contact toolbar application 115 and the CRM applications 120. The connection point 130 can support http protocols or other application protocols. In one implementation, the connection point 130 can only be contacted by tools of the client computing device 105 or the user workstation 110. For example other applications executing outside the workspace of the user workstation 110 (e.g., on computing devices other than the client computing device 105) can be prohibited or blocked by the master connector plugin 125 from accessing or connecting with the connection point 130. In some implementations, communications via the connection point 130 between components of the client computing device (e.g., the contact toolbar application 115 and the CRM applications 120) occur directly, e.g., on the client side or within the client computing device 105 and without passing through an intermediary server.

The CRM applications 120 can each include at least one connector plugin 135. The connector plugins 135 can include software components that can act as extensions or add-ons of the CRM applications 120 to facilitate client side bi-directional communication between the contact toolbar application 115 and the CRM applications 120. The connector plugins 135 can include script or code such as C#, C++, Java, or java script. In some implementations, the connector plugin 135 executes on, within, or as part of the CRM application 120 to identify the connection point 130 within the user workstation 110.

The connector plugin 135 can detect the connection point 130 and register the CRM application 120 (or the connector plugin 135) with the connection point 130 to establish a bi-directional integration channel, via the connection point 130, between the contact toolbar application 115 and the CRM application 120 associated with the connector plugin 135. In some implementations, multiple connector plugins 135 of different CRM applications 120, or different instances (e.g., screens) of the same CRM application 120) on the client computing device 105 can identify and register themselves with the same connection point 130. In this example, the integration channel can provide for communication between the contact toolbar application 115 and any CRM application 120 registered with the connection point 130. The connector plugins 135 can receive data or events from the master connector plugin 125 via the integration channel and the connector plugins 135 can execute custom actions with or for the corresponding CRM application 120. In this example, the contact toolbar application 115 can access data of the CRM applications 120 via the integration channel, e.g., directly, and not via an intervening server, such as a server associated with one of the CRM applications 120. In this example, such a server does not communicate directly with the contact toolbar application 115, via the internet or other communications or data network. In some implementations, the master connector plugin 125 receives an indication that the connector plugin 135 has identified or registered with the connection point 130. In response, the master connector plugin 125 can generate the integration channel.

In some implementations, for example in a call center environment, the master connector plugin 125 publishes an address on the client computing device 105 of the connection point 130. The CRM applications 120 can execute the connector plugins 135 to identify and register their associated CRM applications 120 with the connection point 130 to establish the client side integration channel between the CRM applications and the contact toolbar application 115. When, for example, the contact toolbar application 115 identifies an incoming call or other event, the contact toolbar application 115 can communicate with one or more of the CRM applications 120 to, for example, obtain customer information from the CRM applications 120 via a client side communication internal to the client computing device 105, or between multiple client computing devices 105. For example, a user can operate multiple computing devices 105 from the contact center and the CRM application 120 from one computer device 105 can communicate with the contact tool via the integration channel 205, for example using a local area network connection between the two computing devices 105.

Figure 12:
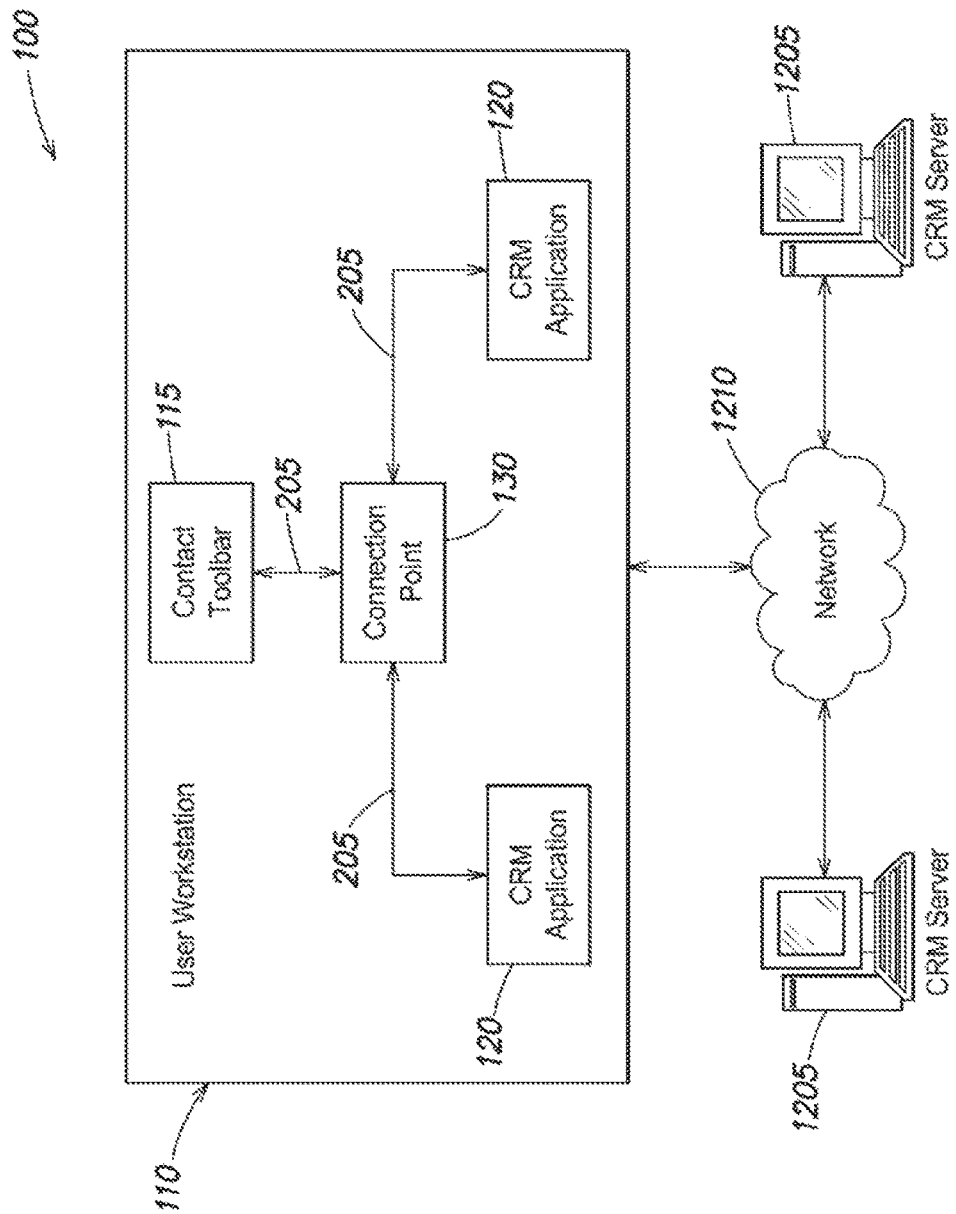
FIG. 12 is a block diagram depicting one example environment for client application interaction on a client computing device, according to an illustrative implementation.

Referring ahead, FIG. 12 illustrates an example environment 100 for client application interaction to facilitate computer telephone integration on the user workstation 110, e.g., of the client computing device 105. The contact toolbar application 115 (or component thereof such as the master connector plugin 125) publishes the connection point 130 within the user workstation 110. The CRM applications 120 execute their respective connector plugins 135 to identify and register to the connection point 130 to establish the integration channel 205. The integration channel 205 includes a communications channel for client side bidirectional communication between different CRM applications 120 and the contact toolbar application 115. The communication between any of the CRM applications 120 and the contact toolbar application 115 via the integration channel 205 can occur directly, e.g., within the user workstation 110 or the client computing device 105, or without passing through an intervening server, such as any of the CRM servers 1205 or the network 1210 such as the internet, a local, wide, or other area network, telephone voice or data network, satellite network, or combinations thereof.

In some implementations, the integration channel 205 establishes a loosely coupled distributed system between the CRM applications 120 or between the contact toolbar application 115 and the CRM applications 120. For example, in the loosely coupled system one CRM application 120 may not make use of the computer telephony integration data of another CRM application 120. In this example, the CRM applications 120 may send respective telephone integration data to the contact toolbar application independently, so that data sent by one CRM application 120 is not used by or relevant to data sent by another CRM application 120.

For example, the CRM applications 120 can each be associated with one or more corresponding CRM server 1205. In some examples, communication between CRM applications 120 or between CRM applications 120 and the contact toolbar application 115 may be server based, or server-side communications. For example, a first CRM application 120 can communicate a request to its corresponding CRM server 1205 via the network 1210. That CRM server 1205 can provide a response to the request, via the network 1210, to another CRM server 1205, which then communicates a response to a second CRM application 120 or to the contact toolbar application 115 via the network 120 where this integrated data may be displayed in a dedicated user interface of the user workstation 110. This server based computer telephony data integration can require load balancing between the CRM servers 1205, hindering scalability. Further, the fault tolerance is low, as the CRM servers 1205 in this server side architecture is a single point of failure architecture. In this server-side, or server to server based communication example, the CRM applications 120 for managing current and potential customers typically cannot directly communicate with each other via an intra-client computing device communication to share data or business rules, communicating instead such data in a server-to-server manner. In some implementations, establishing the client side integration channel 205 provides an alternative to this server based communication.

In some implementations, rather than the above server-side approach, the integration channel 205 is established on the client computing device 105, e.g., the user workstation 110. By providing the connection point 130 and using it to establish the integration channel 205 on user workstation 110, computer telephony data can be exchanged in real time (e.g., during customer communication such as a phone call, even if there is a pause or delay while data is retrieved) via client-side communication in the absence of the server to server communication of the above example. When providing computer telephony data via the integration channel 205, data can be exchanged directly between CRM applications 120 on the client computing device 105. In some implementations, this exchange of data through the integration channel 205 is not routed through the CRM servers 1205 and is not routed through the network 1210.

In some implementations, the integration channel 205 is exclusively for use of the contact toolbar application 115 and the CRM applications 102 for the real time exchange of computer telephony integration data. For example, the connection point 130 can deny or refuse to register additional applications of the client computing device 105 from accessing the integration channel 205, despite an affirmative request received by the master connector plugin 125 from the additional application requesting registration with the connection point 130 or access to the integration channel 205.

Figure 2:
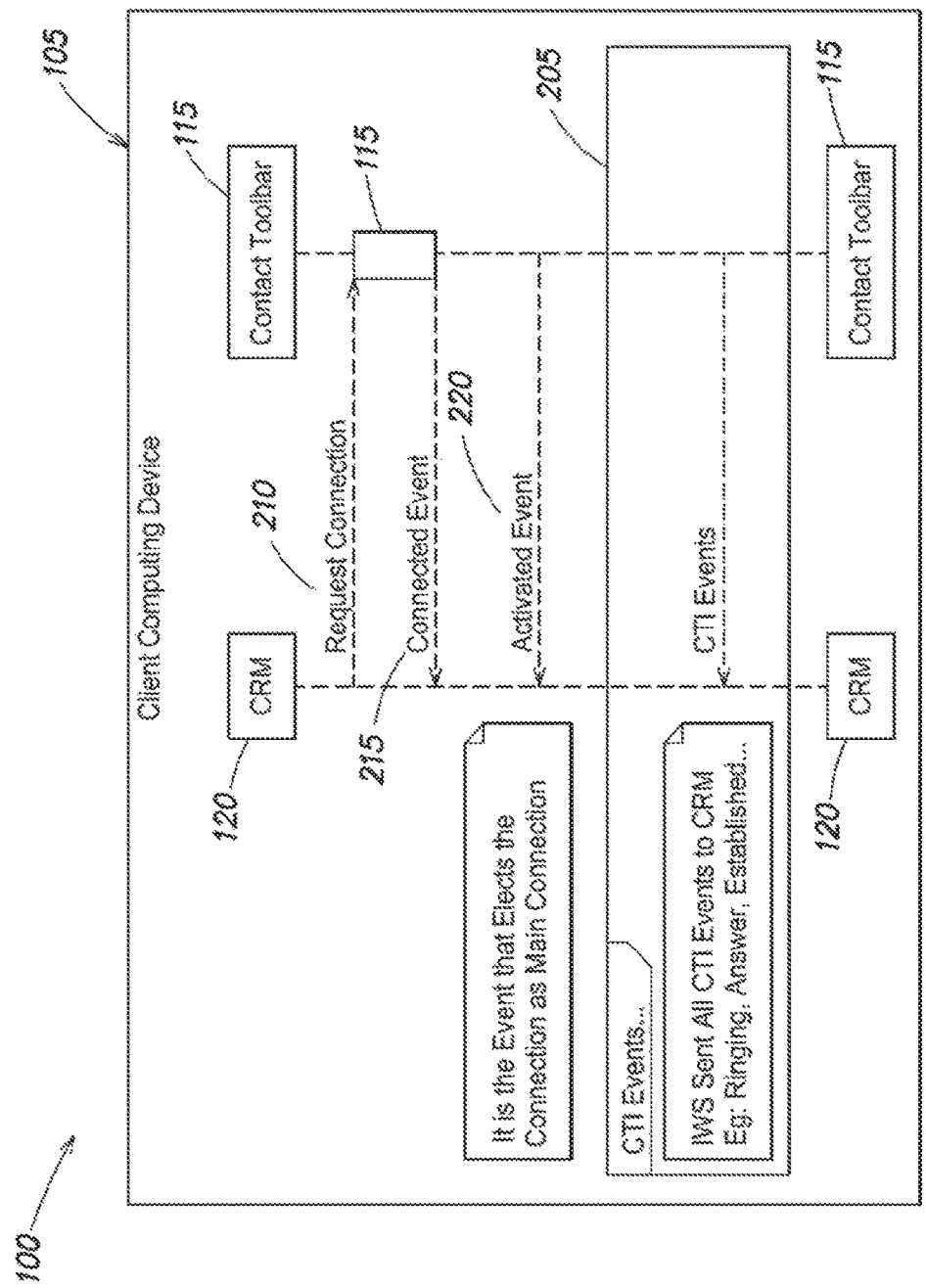
FIG. 2 is a block diagram depicting one example environment for client application interaction on a client computing device, according to an illustrative implementation.

FIG. 2 illustrates an example environment 100 for client application interaction on a client computing device 105. For example, to communicate via the integration channel 205, the contact toolbar application 115 can receive a request 210 from at least one of the CRM applications 120 to establish a connection to the connection point 130. In response, the contact toolbar application 115 can provide a connected event communication 215 to the CRM application 120, establishing the connection via the integration channel 205. In some implementations, the contact toolbar application 115 sends an activated event communication 220 to the CRM application 120. In some implementations, a plurality of CRM applications 120 are connected with the contact toolbar application 115, but exactly one of the connected CRM applications 120 receives the connected event 215. Should that one CRM application 120 become deactivated, e.g., intentionally or resulting from a system failure, the contact toolbar application 115 can provide the activated event communication 215 to a different CRM application 120 to activate a different CRM application 120 for the exchange of data with the contact toolbar application 115. With the integration channel 205 established, via publication of the connection point 130 by the contact toolbar application 115 and registration to the connection point 130 by the CRM application 120, data can then be communicated between the contact toolbar application 115 and the CRM application 120 via the integration channel 205. This data can include computer telephony integration (CTI) data such as data relating to the initiation of a call (ringing), the answering of a call, or the establishment of a telephone or voice over internet protocol call, for example. The CTI data can be provided to at least one CRM application 120 in real time via the integration channel 205 and data about, for example, a customer associated with the call can be retrieved from the CRM application 120.

Figure 3:
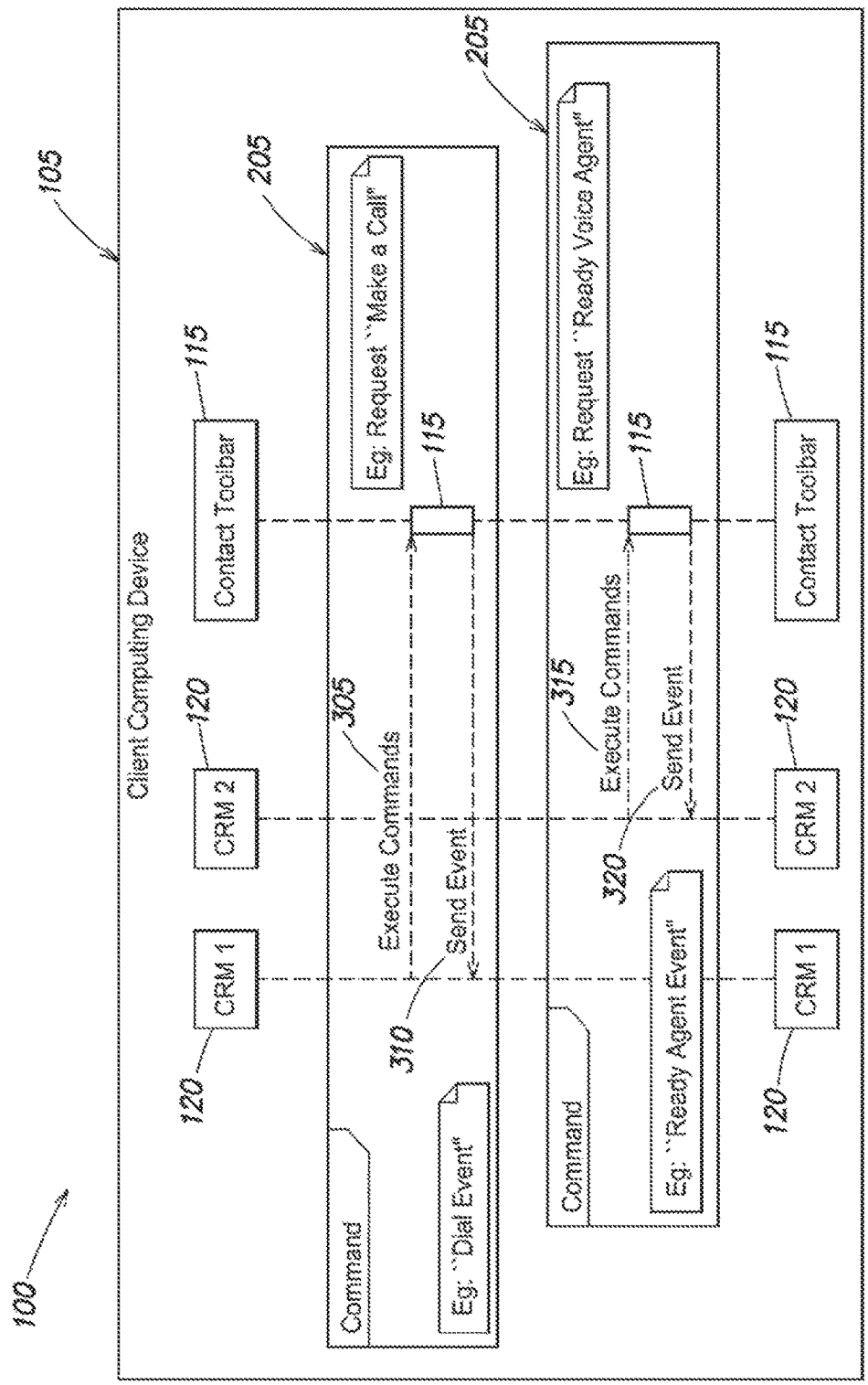
FIG. 3 is a block diagram depicting one example environment for client application interaction on a client computing device, according to an illustrative implementation.

FIG. 3 illustrates an example environment 100 for client application interaction on a client computing device 105. For example, commands and events can be sent between the contact toolbar application 115 and the CRM applications 120 via the integration channel 205. The commands, for example, can include requests sent from the CRM applications 120 to the contact toolbar application 115 via the integration channel 205. The events can be sent from the contact toolbar application 115 to the CRM applications 120 via the integration channel, for example responsive to the commands.

In one example of integrated client-side communication in a call center environment, a first CRM application 120 can send a command 305 via the integration channel 205 to the contact toolbar application 115, such as a request to make a call. In response, the contact toolbar application 115 can send an event 310 such as a dial event back to the first CRM application 120 whereby the user workstation affects a telephone or voice over internet protocol call. A second CRM application can also send a different command such as a command 315 via the integration channel 205 to the toolbar application, such as a request to ready a voice agent, e.g., to alert a human operator of a forthcoming telephone or voice over internet protocol call. In response, the contact toolbar application 115 can send an event 320 such as a ready agent event to the CRM application 120 to alert an operator to prepare for a live call with, for example, a customer.

Figure 4:
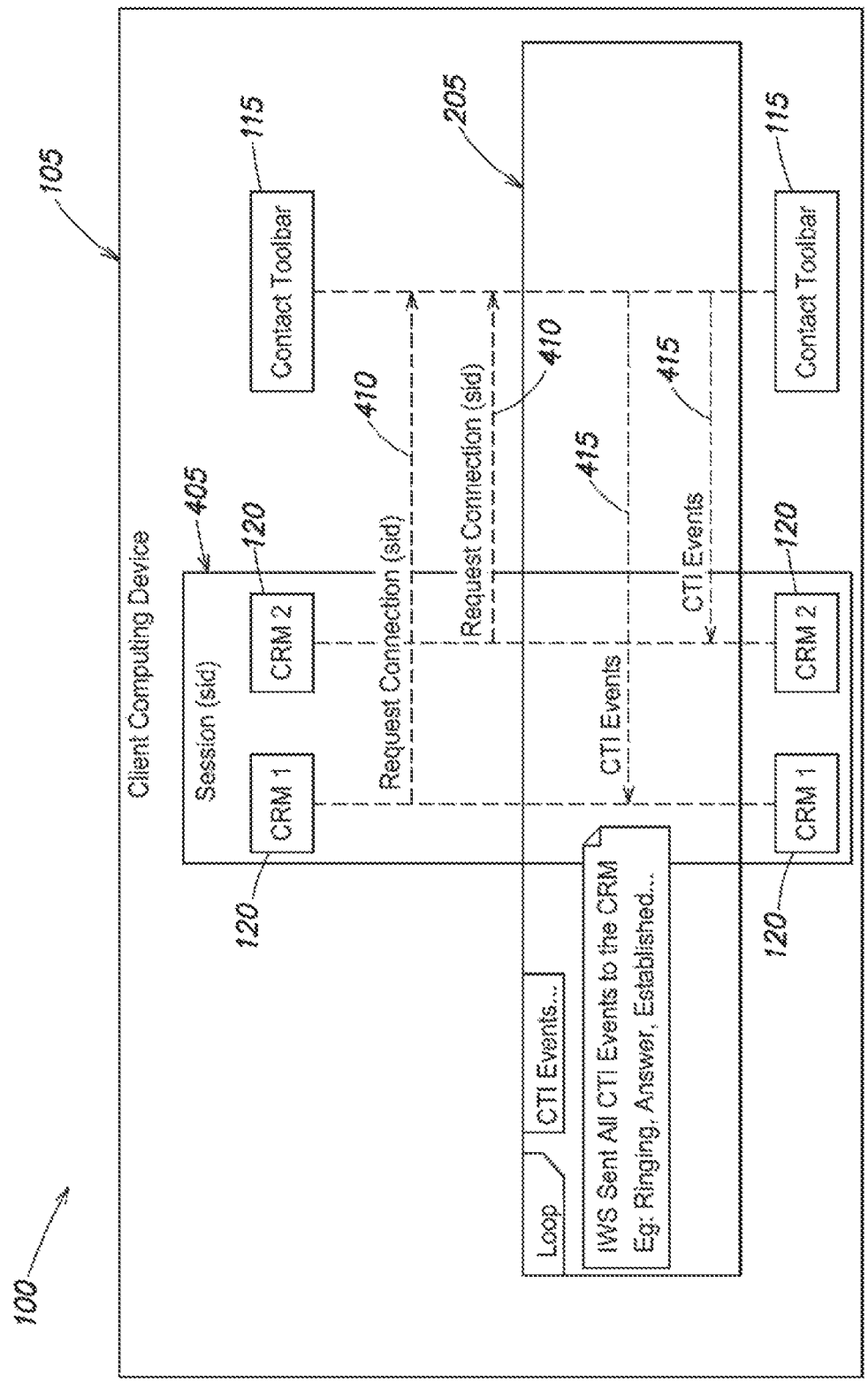
FIG. 4 is a block diagram depicting one example environment for client application interaction on a client computing device, according to an illustrative implementation.

FIG. 4 illustrates an example environment 100 for client application interaction on a client computing device 105. For example, the user workstation 110 can join one or more CRM applications 120 in a unique session 405 via the integration channel 205. The session 405 can be established responsive to requests 410 from the CRM applications 120 to the contact toolbar application 115. With the session 405 established, the contact toolbar application 115 can broadcast a CTI event 415 to more than one CRM application 120 via the integration channel 205.

FIGS. 1-4 generally depict client side communication within the client computing device 105 between the contact toolbar application 115 and different CRM applications 120 via the integration channel 205, without the communicated events or commands passing through an intermediary server. In this way, the contact toolbar application 115 can communicate directly via the integration channel 205 with the CRM applications 120 in the absence of an intermediate server, such as a server associated via a computer network with one of the CRM applications 120.

Figure 5:
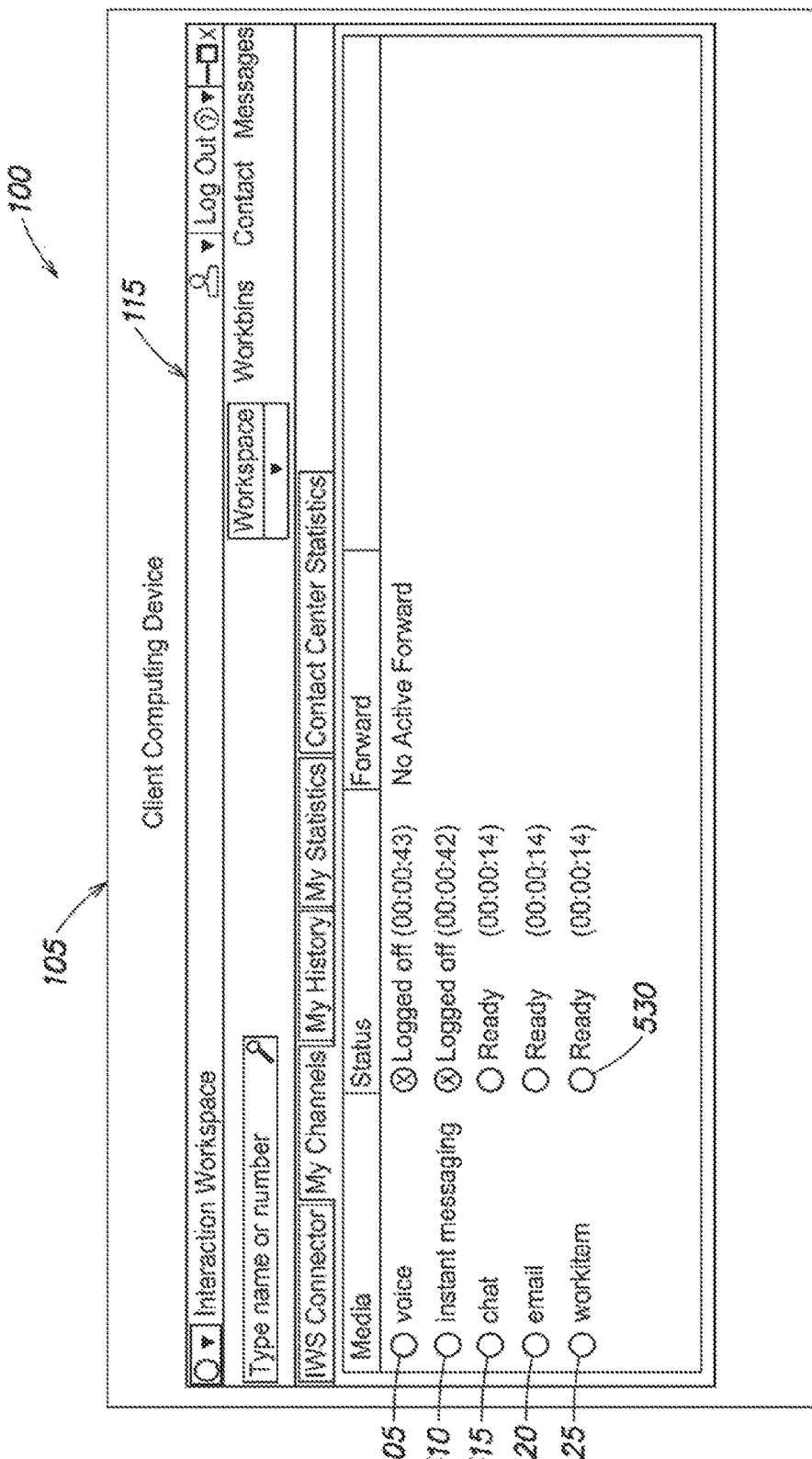
FIG. 5 is a display depicting one example of a contact toolbar application on a client computing device, according to an illustrative implementation.

FIG. 5 illustrates an example display of the contact toolbar application 115 in a user interface of the client computing device 105. The contact toolbar application 115 allows the operator of the user workstation 110 to receive, accept or manage customer requests, such as a voice communication 505, an instant messaging communication 510, a chat communication 515, an email communication 520, or a work item communication 525. For example, the contact toolbar application 115 can display an indication that the communications (e.g., 505-525) are in an active state (e.g., by displaying the word "ready" or other indicator) or an inactive state (by displaying the words "logged off" or other indicator). The communications 505-525 can also include a display 530 such as a color coded or symbol display that indicates an active, inactive, or other state. The contact toolbar application 115 can initiate or establish the communications 505-525 with customers.

In some implementations, the client computing device 105 includes a graphical user interface to display a visualization of the contact toolbar application 115. The display, for example, can indicate various types of computer telephony integration data, such as voice data, instant messaging data, short message service data, chat data, telephone network data, voice over internet protocol data, email data, or work item data. The display in the user interface can indicate a session state of the contact toolbar application 115 or the CRM application 120, such as an active state, a connected but inactive state, or a disconnected state.

Figure 6:
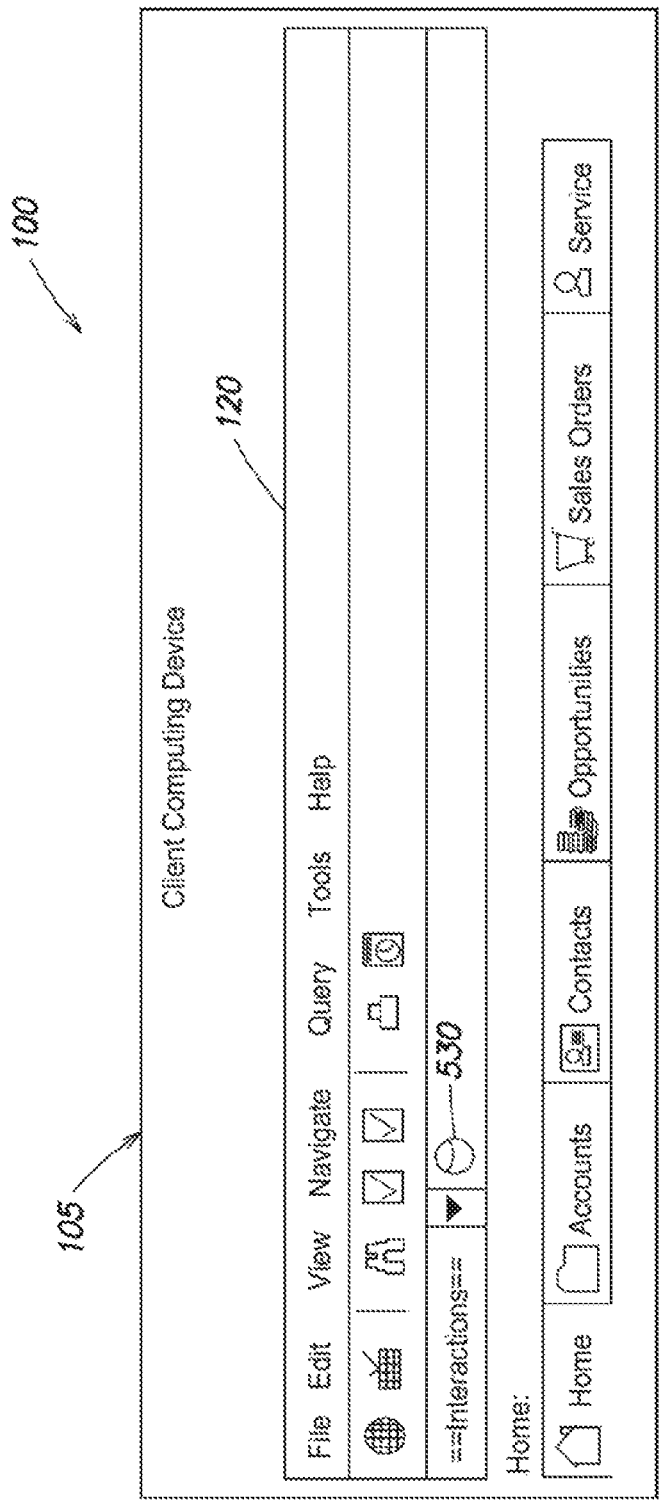
FIG. 6 is a display depicting one example of a client application on a client computing device, according to an illustrative implementation.

FIGS. 6-11 illustrate example displays of the CRM application 120 in a user interface of the client computing device 105. FIG. 6 illustrates a portion of the CRM application 120 with the display 530 indicating an active CRM session between the CRM application 120 and the contact toolbar application 115, e.g., via the integration channel. For example, the display 530 may be green to indicate the active CRM session. The active CRM session allows bidirectional communication between the contact toolbar application 115 and the CRM application 120 via the integration channel. During the active CRM session, the CRM application 120 is connected via the connection point 130 with the contact toolbar application 115 and ready to receive events, notifications, or other communications from the master connector plugin 125 of the contact toolbar application 115.

Figure 7:
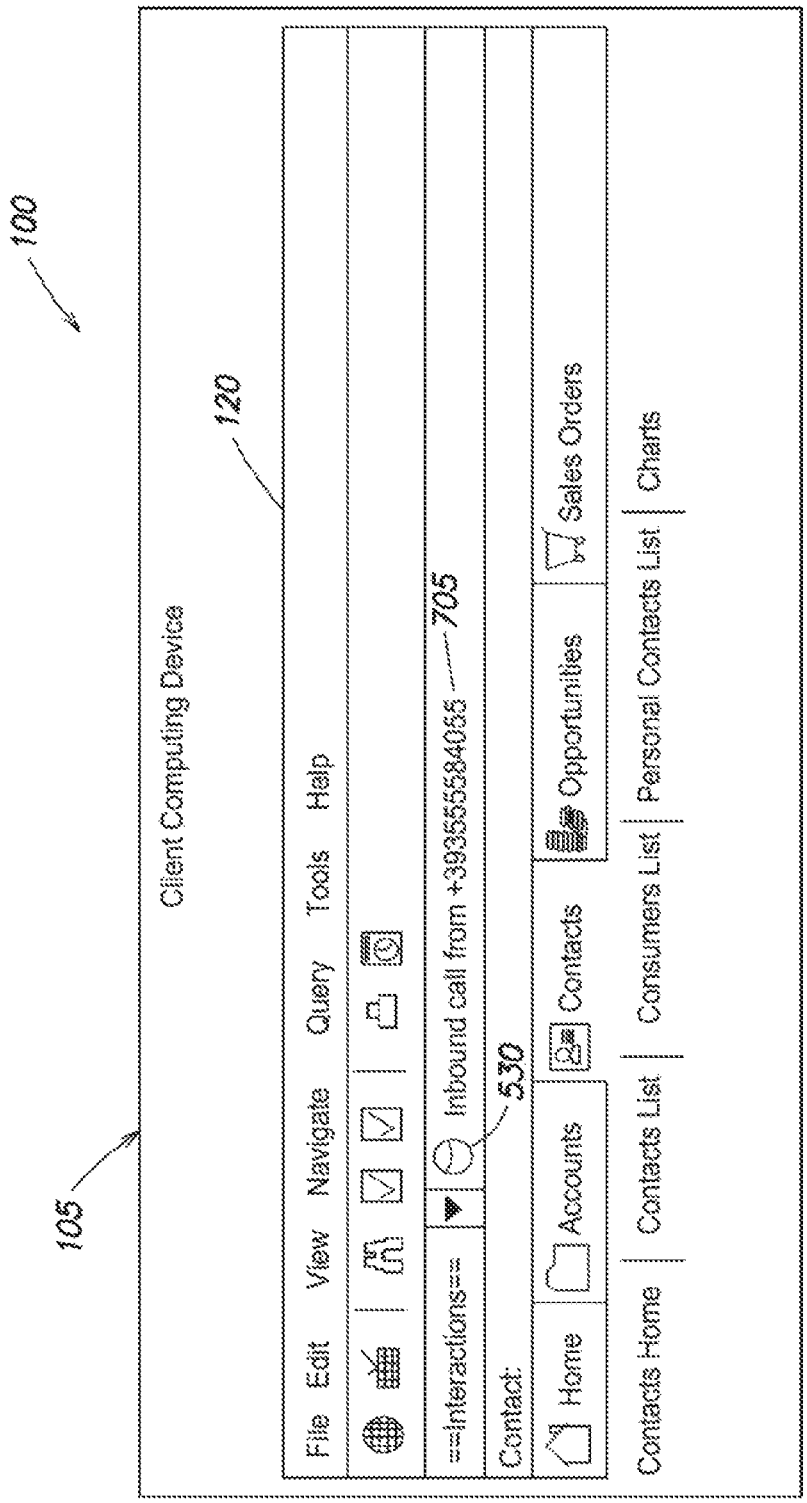
FIG. 7 is a display depicting one example of a client application on a client computing device, according to an illustrative implementation.

FIG. 7 illustrates a portion of the CRM application 120 with the display 530 indicating an active CRM session between the CRM application 120 and the contact toolbar application 115 via the integration channel. The display 530 can be coded (e.g., green) to indicate an active CRM session between the CRM application 120 and the contact toolbar application 115. In this example, the CRM application 120 has received a notification from the master connector plugin 125 of an incoming call 705, which can be identified in the display of the CRM application 120.

Figure 8:
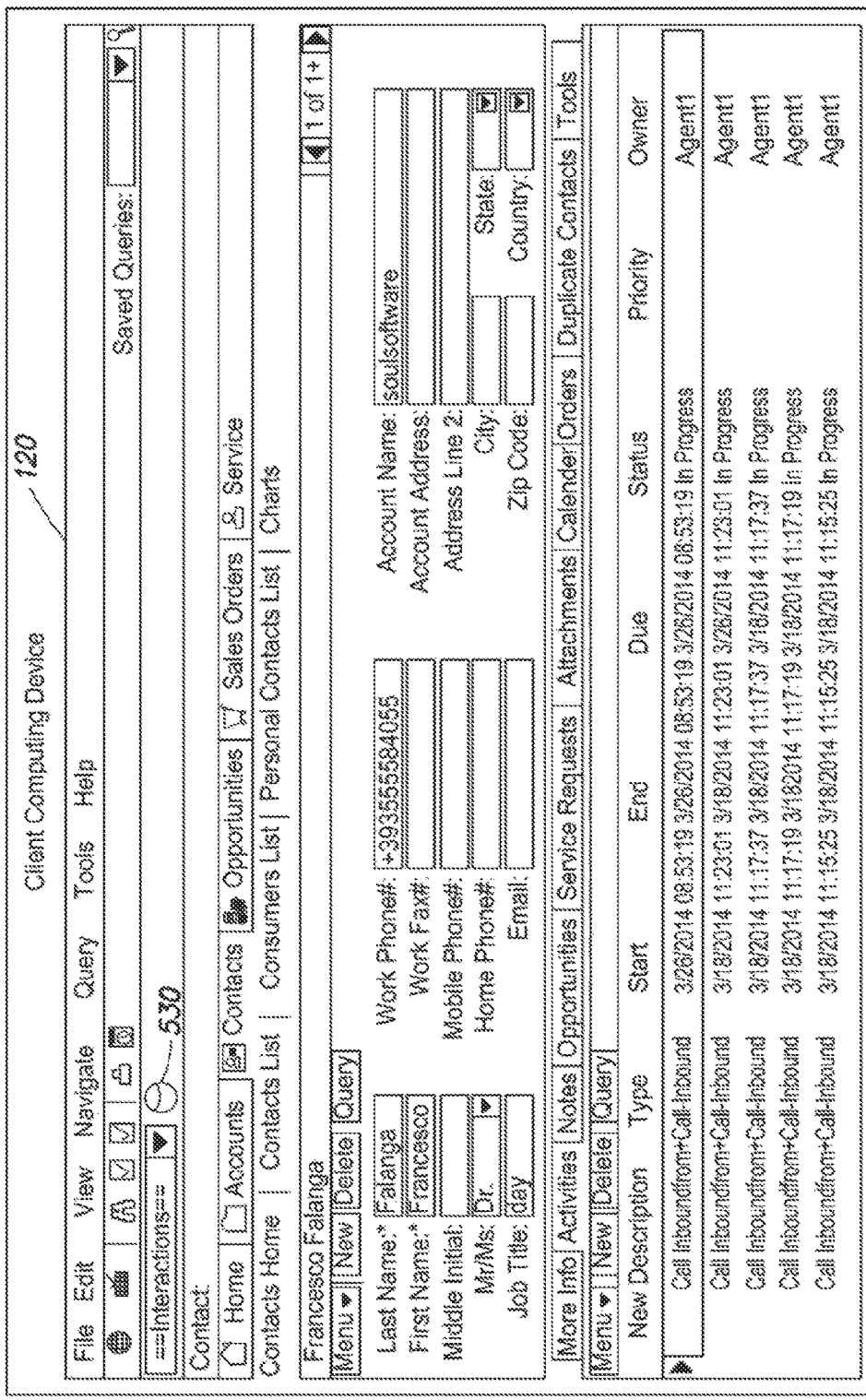
FIG. 8 is a display depicting one example of a client application on a client computing device, according to an illustrative implementation.

FIG. 8 illustrates a portion of the CRM application 120 with the display 530 indicating an active CRM session between the CRM application 120 and the contact toolbar application 115. The display 530 can be coded (e.g., green)

to indicate an active CRM session or between the CRM application 120 and the contact toolbar application 115. In this example the CRM application 120 is in an active state and connected with the contact toolbar application 115 and ready to receive events, notifications, or other communications from the master connector plugin 125 of the contact toolbar application 115. FIG. 9 illustrates a portion of the CRM application 120 with the display 530 indicating an active CRM session between the CRM application 120 and the contact toolbar application 115, where the CRM application 120 has received an event, such as an inbound voice call identified for example in interface window 905.

Figure 10:
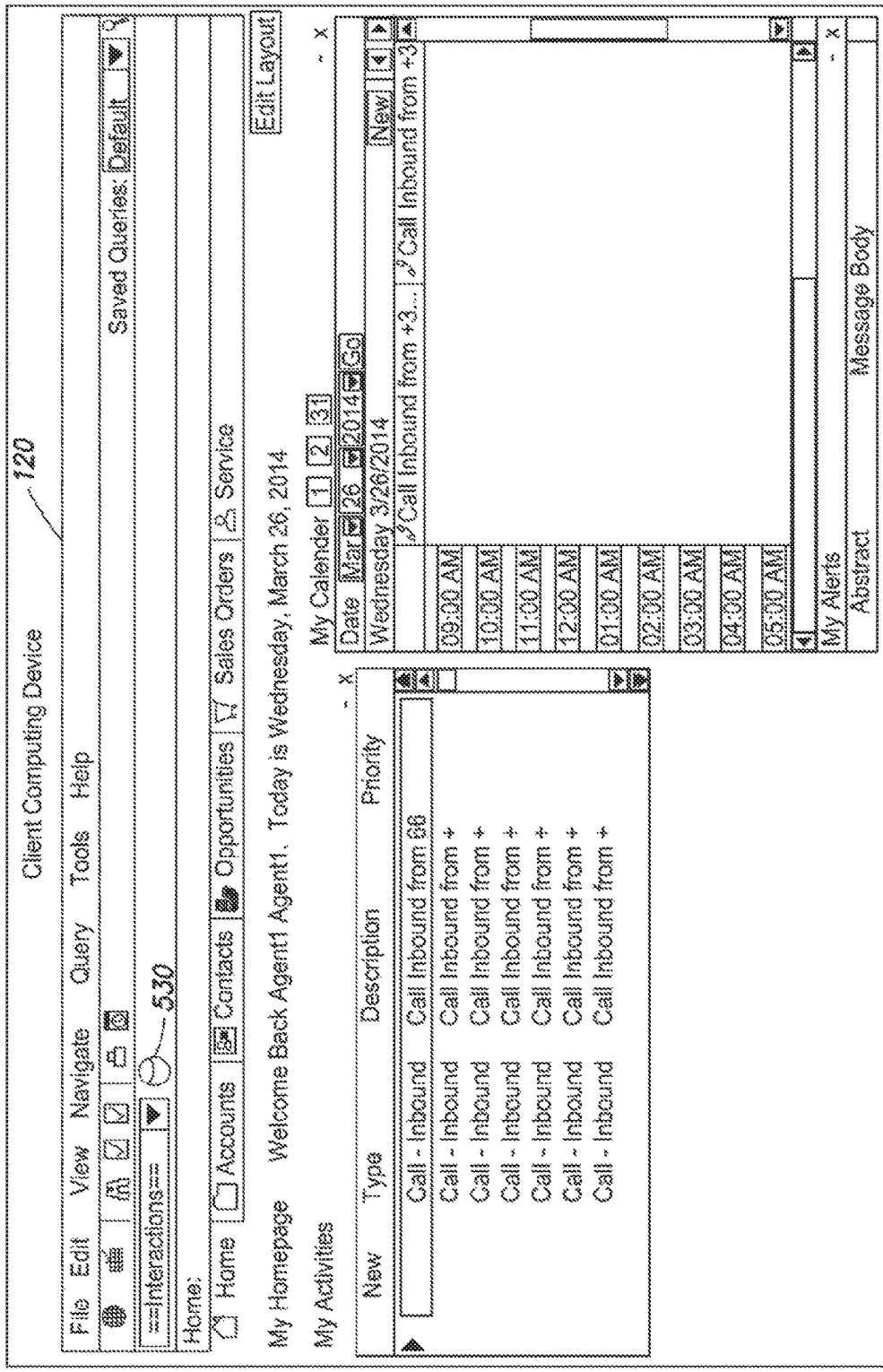
FIG. 10 is a display depicting one example of a client application on a client computing device, according to an illustrative implementation.

FIG. 10 illustrates a portion of the CRM application 120 with the display 530 indicating a connected but inactive CRM session or state between the CRM application 120 and the contact toolbar application 115. For example, the display 530 can be color coded (e.g., yellow) to indicate that the CRM application 120 is connected with the contact toolbar application 115 but is not an active connection through which telephony integration data is presently passing. For example, a different CRM application 120 may be active and communicating telephone integration data with the contact toolbar application 115 via the integration channel at this time.

Figure 11:
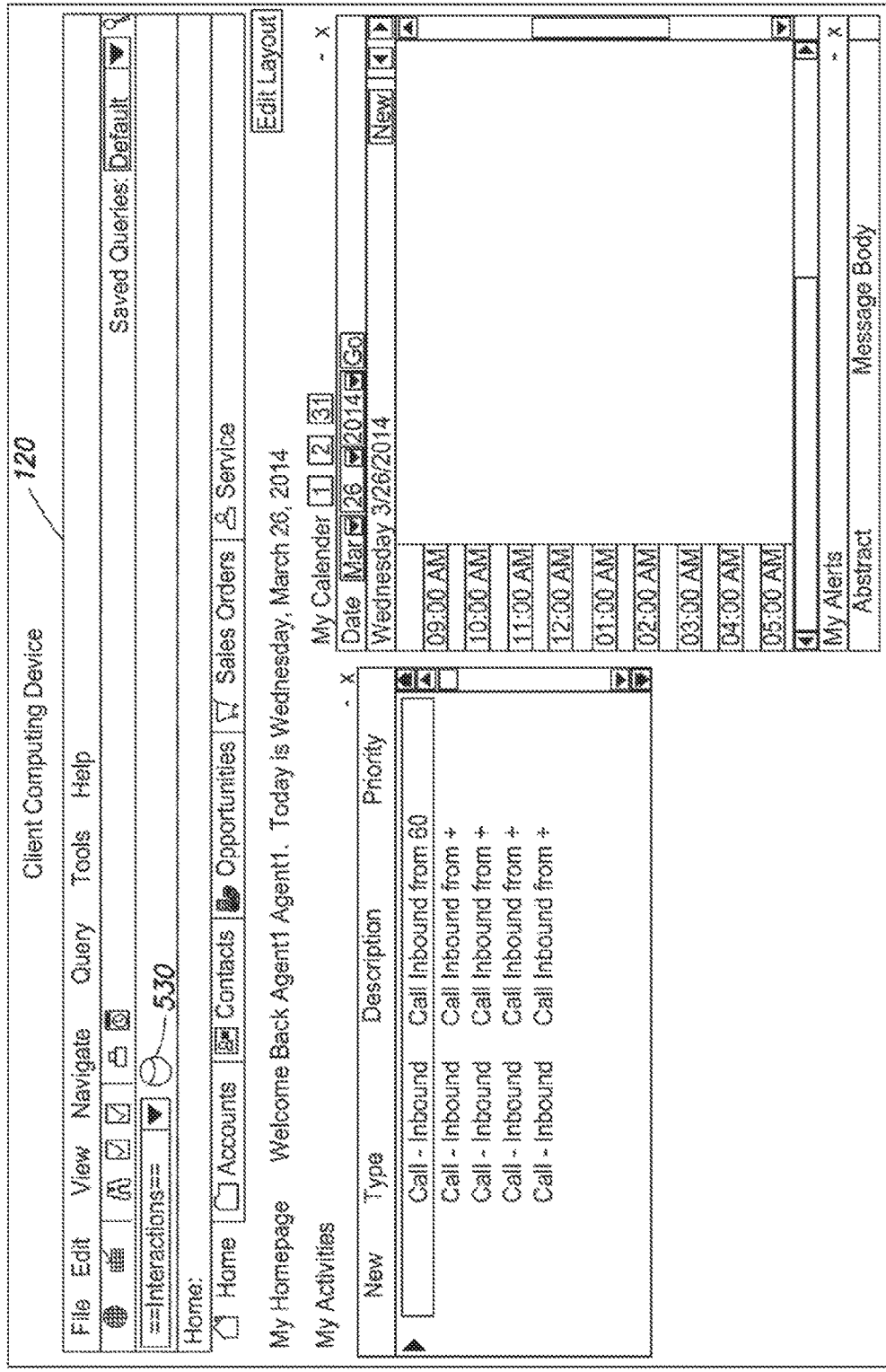
FIG. 11 is a display depicting one example of a client application on a client computing device, according to an illustrative implementation.

FIG. 11 illustrates a portion of the CRM application 120 with the display 530 indicating a disconnected CRM session or state between the CRM application 120 and the contact toolbar application 115. For example, the display 530 can be color coded (e.g., red) to indicate that the CRM application 120 is disconnected with the contact toolbar application 115 via the integration channel. For example, a different CRM application 120 may be active and communicating telephone integration data with the contact toolbar application 115 via the integration channel at this time.

Figure 13:
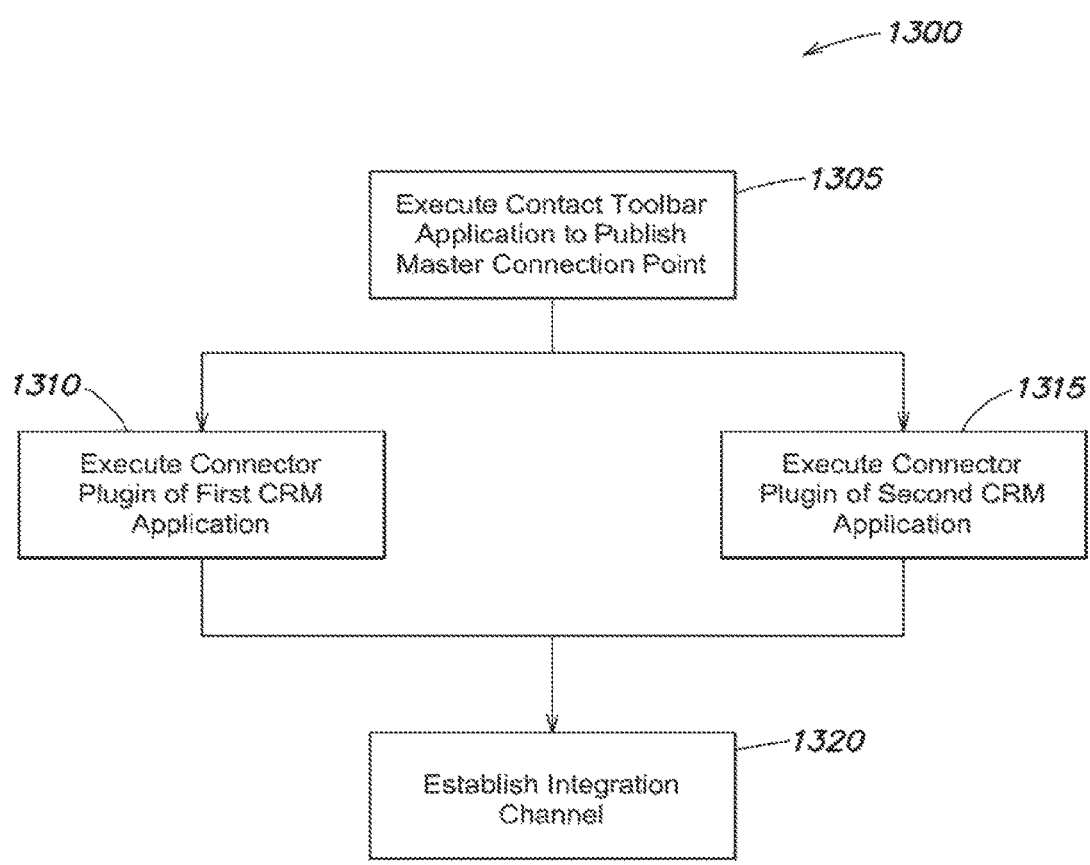
FIG. 13 is a flow diagram depicting an example method of client application interaction on a client computing device, according to an illustrative implementation.

FIG. 13 is a flow diagram depicting an example method 1300 of client application interaction on a client computing device, according to an illustrative implementation. The method 1300 can include executing the contact toolbar application 115 of the client computing device 105 to publish a connection point 130 (ACT 1305). For example, the processor of the client computing device 105 can execute the master connector plugin 125 of the contact toolbar application 115 to publish or identify an address for the connection point 130. The method 1300 can execute the connector plugin 135 of a first CRM application 120 (or other client application) to identify the connection point 130 and to establish a connection between the first CRM application 120 and the contact toolbar application 115 via the connection point 130 (ACT 1310). The method 1300 can execute the connector plugin 135 of a second CRM application 120 (or other client application) to identify the connection point 130 and to establish a connection between the second CRM application 120 and the contact toolbar application 115 via the connection point 130 (ACT 1315). The method 1300 can establish the integration channel 1205 on the client computing device 105 (e.g., on the user workstation 110) (ACT 1320). The integration channel 205 can be used for the real time exchange of computer telephony integration data between the contact toolbar application 115 and at least one of the first CRM or other client application 120 and the second CRM or other client application 120.

The contact toolbar application 115 or component thereof such as the master connector plugin 125 can generate or publish at least one connection point 130 on the client computing device 105, e.g., within the user workstation 110. The connection point 130 can be used to establish the integration channel 205. For example, the CRM applications 120 can execute the connector plugin 135 or other component to identify and establish a connection with the connection point 130. This can form the integration channel 205, e.g., a communications channel for the exchange of computer telephone integration data between the contact toolbar application 115 and the CRM applications 120 within the client computing device 105. The computer telephony integration data can include data about customers, employees, or people connected to a call with the user of the client computing device 105. The telephony integration can include telephony data, such as a phone number, identify of a caller, time details of a call, location of a caller, or telephone metadata, as well as other information such as customer details from a database associated with the CRM applications 120 that is not telephony data. The computer telephony integration data can be exchanged in real time between components of the user workstation 110. For example, during a call with a customer through the client computing device, the contact toolbar application 115 can communicate with the CRM application 120 to obtain telephony integration data via the integration channel 205.

The contact toolbar application 115 can include a script. The script can be installed on or executed by the client computing device 105 to transmit, receive, or obtain the computer telephony integration data via the integration channel 205 directly, e.g., via the CRM application 120 and not via an intermediary server or computer network communication between the contact toolbar application and an intermediary server such as the CRM server 1205. In some implementations, the contact toolbar application 115 can interact with one CRM application 120 to exchange computer telephony integration data via the integration channel 205, and can concurrently interact with another CRM application 120 to exchange computer telephony integration data via the integration channel 205.

The concurrent interaction need not be simultaneous. For example during a time period (e.g., of a phone call with a customer), the computer telephone integration data can be sequentially transmitted via the integration channel to the contact toolbar application 115 from multiple CRM applications 120. Transactions during this time period can be considered as real time or concurrent transactions as the contact toolbar application 115 (or the CRM applications 120) can access or display the information during a time period when it is of use to an operator of the client computing device 105 (e.g., during a phone call with a customer).

The CRM applications 120 and the contact toolbar application 115 can provide a display in a graphical user interface of the client computing device 105. The display can indicate an active session state with the contact toolbar application 115 via the integration channel 205, a connected but inactive state with the contact toolbar application 115 via the integration channel 205, and a disconnected session state with the contact toolbar application 115 via the interaction channel 205. The active session state can occur when the contact toolbar application 115 and the CRM application 120 are connected with the integration channel 205 via the connection point 130, and computer telephony data is being transmitted through the integration channel 205. The connected but inactive state can occur when the contact toolbar application 115 and the CRM application 120 are connected with the integration channel 205 via the connection point 130, but computer telephony data is not being transmitted through the integration channel 205. The inactive or disconnected session state can occur when the contact toolbar application 115 and the CRM application 120 is not connected with the integration channel 205 via the connection point 130, and computer telephony data is not being transmitted through the integration channel 205.

In some implementations, the contact toolbar application 115 executes within the user workstation 110 to provide or transmit an activation event to the CRM application 120, for example via the integration channel 205. The CRM application 120 can receive the activation event and in response transmit a command via the integration channel 205 to enter the active state. This may occur during a time period when a second CRM application 120 is in a connective but inactive state with the contact toolbar application 115. The contact toolbar application 115 can also receive a request command from the CRM application 120 to establish a connection with the connection point 130 and in response can provide a connect event to the CRM application 120 to include the CRM application 120 in the integration channel 205, or to allow the CRM application 120 to transmit and receive computer telephony data via the connection channel 205.

The client computing device 105 (or component thereof such as the contact toolbar application 115) can execute a script to establish an active session between the contact toolbar application 115 and the CRM application 120 for the real time exchange of computer telephony integration data via the integration channel 205. The contact toolbar application 115 or the CRM application 120 can be displayed in a user interface of the client computing device 105 and can indicate the session state (e.g., active, connected but inactive, or disconnected). For example color coded circular display mimicking an LED can be displayed, with green indicated an active state, yellow indicating a connected but inactive state, and red indicating a disconnected state of the associated component such as the CRM application 120.

The contact toolbar application 115 can receive and send computer telephony integration data. For example, the contact toolbar application 115 can receive a command from one CRM application, such as a request to make a call, and in response can send an event to the CRM application to dial a number to establish the call. The contact toolbar application 115 can receive and send multiple commands to multiple CRM applications 120.

In some implementations, the contact toolbar application 115 can receive a first connection request from a first CRM application 120, and can receive a second connection request from a second CRM application 120. For example, the CRM applications can request to register with the connection point 130, and this request can be received by the master connector plugin 125. The contact toolbar application 115 can establish, via the integration channel 205, a communication session between the CRM applications 120 and the contact toolbar application 115. The contact toolbar application 115 can provide computer telephony events (e.g., data) to the first CRM application 120 and can provide the same or different computer telephony events (e.g., data) to the second CRM application 120 via the integration channel 205 during the communication session.

In some implementations, the agent workstation 110 or its components (e.g., the master connector plugin 125 or the connector plugin 135) are middleware components or part of a software driver to enable the communication and management of computer telephony data in an enterprise application integration system. These components can be part of a software layer between the operating system of the client computing device 105 and applications of a distributed computing system (e.g., the CRM application 120). In some implementations, the contact toolbar application 115 and the CRM application 120 also include middleware components.

Figure 14:
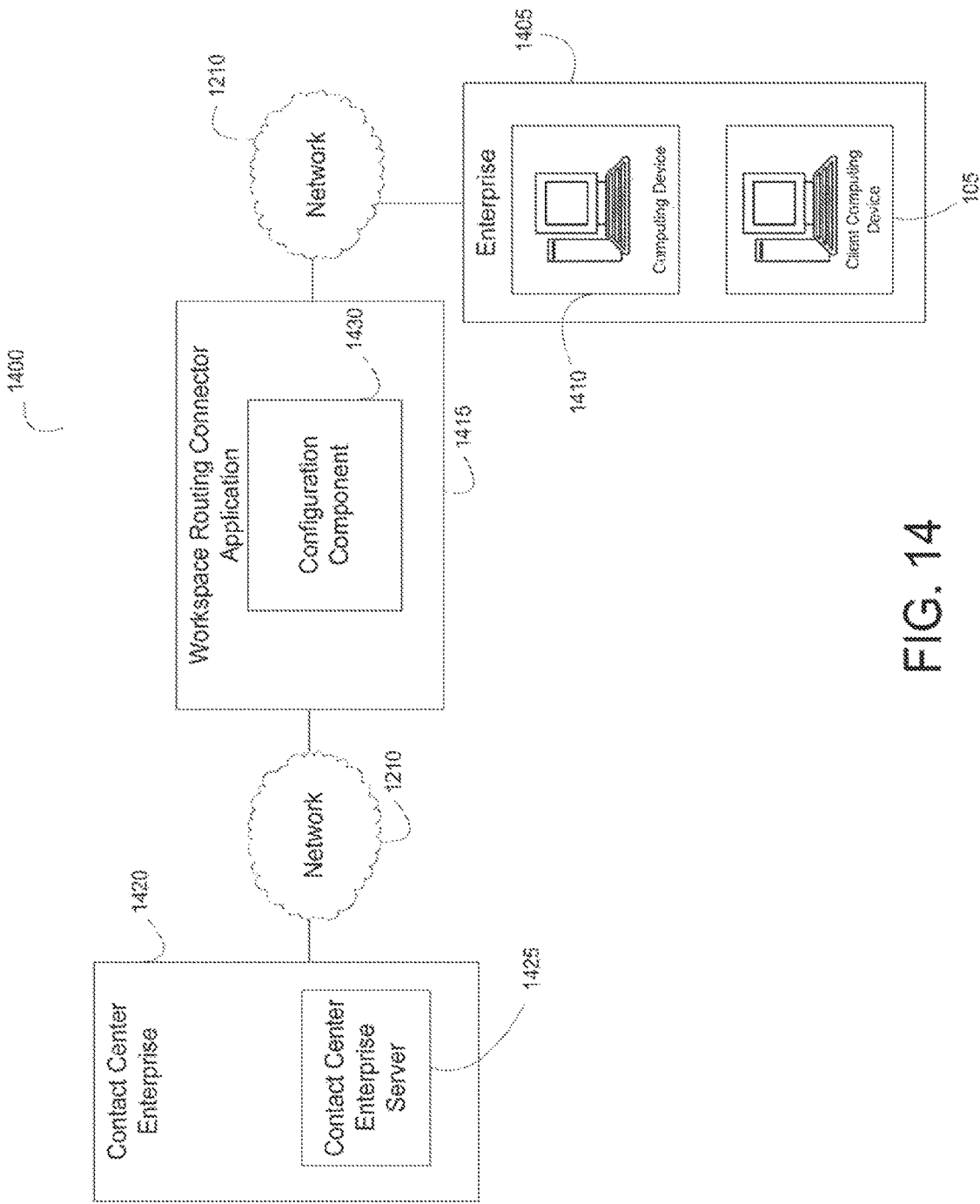
FIG. 14 is a block diagram depicting one example environment for contact center data integration, according to an illustrative implementation.

FIG. 14 depicts an example environment 1400 for contact center (e.g., telephony integration) data. The environment 1400 can include the environment 100. The environment 1400 can include at least one company or enterprise 1405. The enterprise 1405 can operate a contact center, such as a customer support center to interface with end users or customers of the enterprise 1405. The enterprise 1405 can include at least one computing device 1410 and at least one client computing device 105. The computing devices 1410 and the client computing devices 105 can be the same or different types of computing devices for use by the same or different end users associated with the enterprise 1405. For example, the client computing device 105 can include a desktop, laptop, tablet, or thin client computing device that includes the user workstation 110 for access by a call center agent, and the computing device 1410 can include a desktop, laptop, tablet, or thin client computing device accessed by a technology administrator (e.g., a person who is not a call center agent) to create, edit, or launch the workspace routing connector application 1415 or CRM script discussed herein.

The environment 1400 can include at least one workspace routing connector application 1415. The workspace routing connector application 1415 can include a script, program, or app executed by at least one processor of at least one computing device to communicate, e.g., via the network 1210 (or other computer network) with the enterprise 1405 or with computing devices of at least one contact center enterprise 1420. The workspace routing connector application 1415 can include hardware, software, and combinations thereof. The contact center enterprise 1420 can include an entity that provides contact center applications or functionality to the enterprise 1405 for use by the enterprise 1405. For example the enterprise 1405 can include a utility company, and the contact center enterprise 1420 can include an entity that provides a contact center program or functionality, including for example software products, to a contact center of the utility company to manage calls, emails, text messages or other incoming communication received by the utility company from their customers.

The contact center enterprise 1420 can include at least one contact center enterprise server 1425. The contact center enterprise server 1425 can be or include the CRM server 1205 or a different server. The contact center enterprise server 1425, (which can include an associated database or memory) can include various end user parameters, such as name, email address, username, chat name, address, purchase history, or contact center communication history, for example. The workspace routing connector application 1415 can interface with the CRM server 1205 to obtain these parameters. The workspace routing connector application 1415 can be installed on or executed by devices associated with the contact center enterprise 1420 or with the enterprise 1405. For example, the contact center enterprise server 1425 can be installed on or executed by the contact center enterprise server 1425, the computing device 1410, or the client computing device 105 or other intermediary device or appliance.

The workspace routing connector application 1415 can be executed responsive to an actuation command (e.g., a click on a button, link, or other interface) displayed in a graphical user interface of a computing device. For example, the workspace routing connector application 1415 can be executed by the contact center enterprise server 1425 (e.g., an enterprise server of the contact center enterprise 1420) responsive to an actuation command received by the workspace routing connector application 1415 from a computing device associated with the enterprise, e.g., the computing device 1410 or the client computing device 105. The actuation request can be received via the computer network 1210. The workspace routing connector application 1415 can execute to establish a communication session with at least one CRM application 120 on the client computing device 105 via, for example the computer network 1210. Data regarding contact center callers associated with selected contact center parameters can be provided to the client computing device 105 for display during, through, or via the communication session.

The workspace routing connector application 1415 can include at least one configuration component 1430. The configuration component 1430 can include a script, program, or app executed by at least one processor of at least one computing device to communicate, and can include hardware, software, and combinations thereof. For example, a technology administrator associated with the enterprise 1405 can configure the workspace routing connector application 1415 to interface with the contact center enterprise server 1425 to provide contact center services to the enterprise 1405 via the client computing devices 105.

Figure 15:
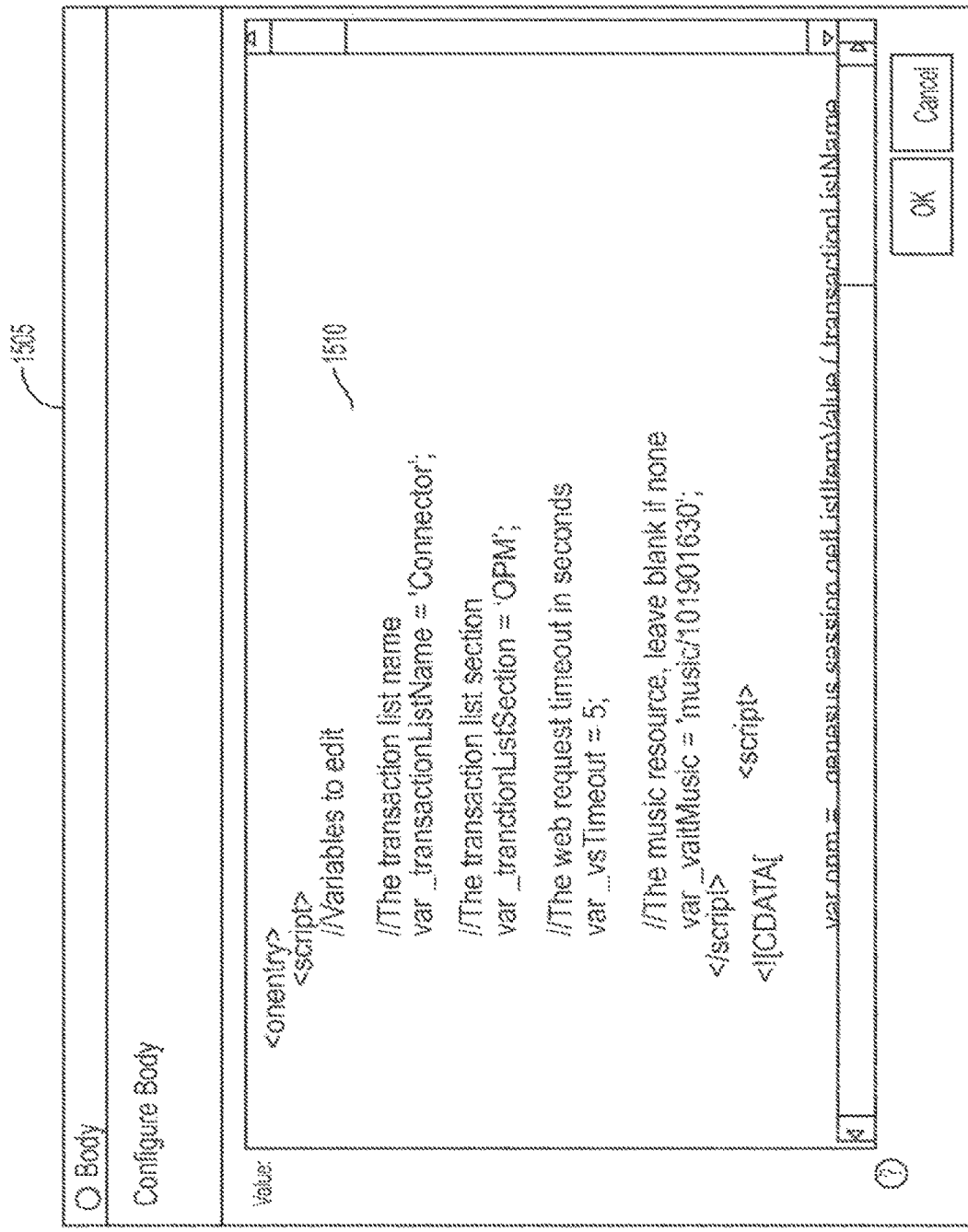
FIG. 15 is a configuration window depicting a configuration script of the workspace routing connector application, according to an illustrative implementation.

Referring to FIG. 14 and FIG. 15, among others, the technology administrator can command the computing device 1410 to launch (or to instruct another computing device such as the contact center enterprise server 1425 to launch) the workspace routing connector application 1415 in order to select user or other parameters to be used in the contact center environment. This can cause the configuration component 1430 to provide the configuration window 1505 for display by, for example, the computing device 1410. The configuration window 1505 can include at least one configuration script 1510. The configuration script 1510 can receive input commands from the computing device 1410 to modify or edit the configuration script 1510, or to select parameters or other variables such as phone numbers, email addresses, chat names, usernames, contact center history data, past purchase data, or other information.

In this example, the (e.g., third party) workspace routing connector application 1415 and the configuration component 1430 act as an intermediary or interface with the contact center enterprise 1420 so that the technology administrator does not need to interface directly with languages, proprietary systems, components, modules, customizations, or programs of or directly associated with the contact center enterprise 1420. Responsive to a receipt of an input command that identifies one or more parameters, the configuration component 1430 (or other piece of the workspace routing connector application 1415) can execute to select at least one contact center parameter from the contact center enterprise server 1425. This selection can occur as part of a set-up process to implement a contact center environment for the enterprise 1405.

Figure 16:
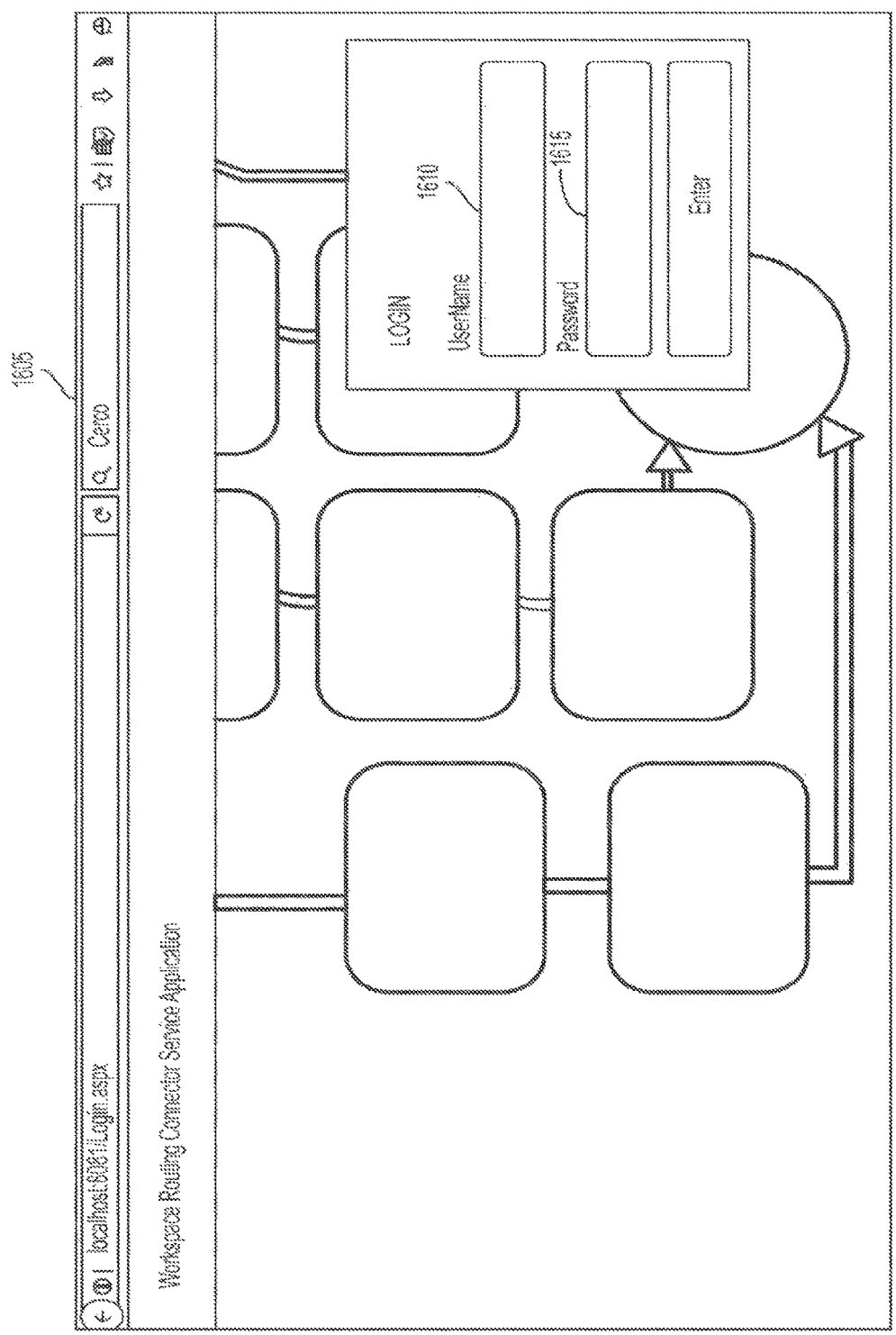
FIG. 16 is a logon window depicting a logon electronic document of the workspace routing connector application, according to an illustrative implementation.

Referring to FIG. 16, the workspace routing connector application 1415 can include at least one logon screen or display 1605. For example, the workspace routing connector application 1415 can generate or provide the logon screen 1605 in a graphical user interface, displayed for example by the computing device 1410 or the client computing device 105. The logon display 1605 can include at least one username interface 1610 or at least one password interface 1615. A technology administrator or a contact center agent can enter username or password information into the respective interfaces to access the workspace routing connector application 1415 to operate the contact center or to make changes to the workspace routing connector application 1415 or its associated scripts or components.

Figure 17:
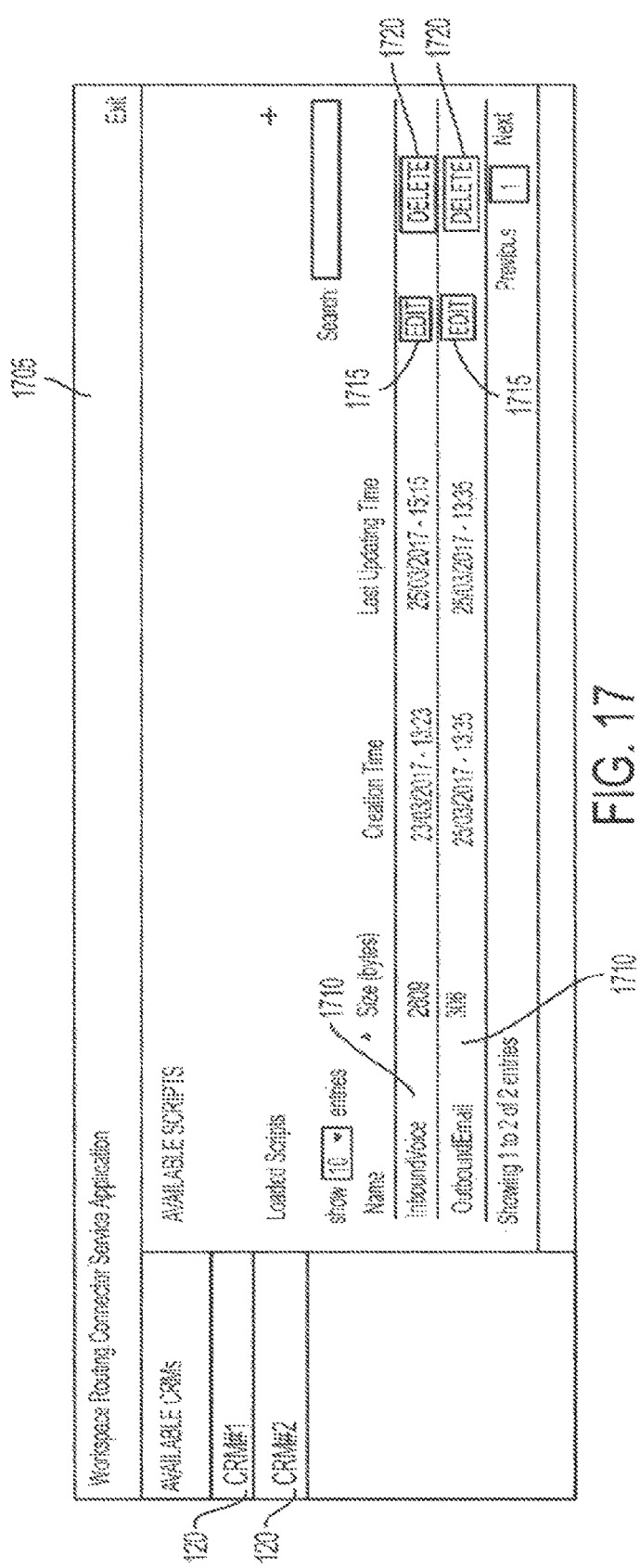
FIG. 17 is a customer relationship management selection window of the workspace routing connector application, according to an illustrative implementation.

Referring to FIG. 17, among others, the workspace routing connector application 1415 can include or provide at least one graphical user interface 1705 for display, e.g., by the computing device 1405 to the technology administrator, or by the client computing device 105 to the contact center agent. For example, the workspace routing connector application 1415 can execute to launch a window that includes the graphical user interface 1705. The graphical user interface 1705 can include or indicate at least one available CRM application 120. The graphical user interface 1705 can also include or indicate at least one CRM script 1710. The CRM script 1710 (or the CRM application 120) can include data that corresponds to the contact center parameters selected by the configuration component 1430. For example, the graphical user interface 1705 can be provided by the workspace routing connector application 1415 to the computing device 1410 for display to the technology administrator. Via the graphical user interface 1705, the workspace routing connector application 1415 can receive an indication of a selection of, for example, the CRM script 1710 or the CRM application 120. The CRM script 1710 can be provided in an edit mode. For example, via a pointing tool in the graphical user interface 1705, the user can click the edit button 1715 or the delete button 1720 to edit or delete one of the CRM scripts 1710, for example by providing an edit command. The edit command, for example, can introduce a new or different (e.g., second) contact center parameter. In some implementations, each of the plurality of CRM scripts 1710 displayed in the graphical user interface 1705 includes (e.g., is based at least in part on) a different contact center parameter.

The workspace routing connector application 1415 can function as an adapter, driver, or proxy to the CRM application 120 that provides a comprehensive set of services to perform common or more useful tasks related to customer relationship management. As a driver or proxy, the workspace routing connector application 1415 can hide implementation details regarding customer relationship management integration and can publish or provide a common, stable, or reliable set of services (e.g., CRM scripts 1710) across customer relationship management systems.

Figure 18:
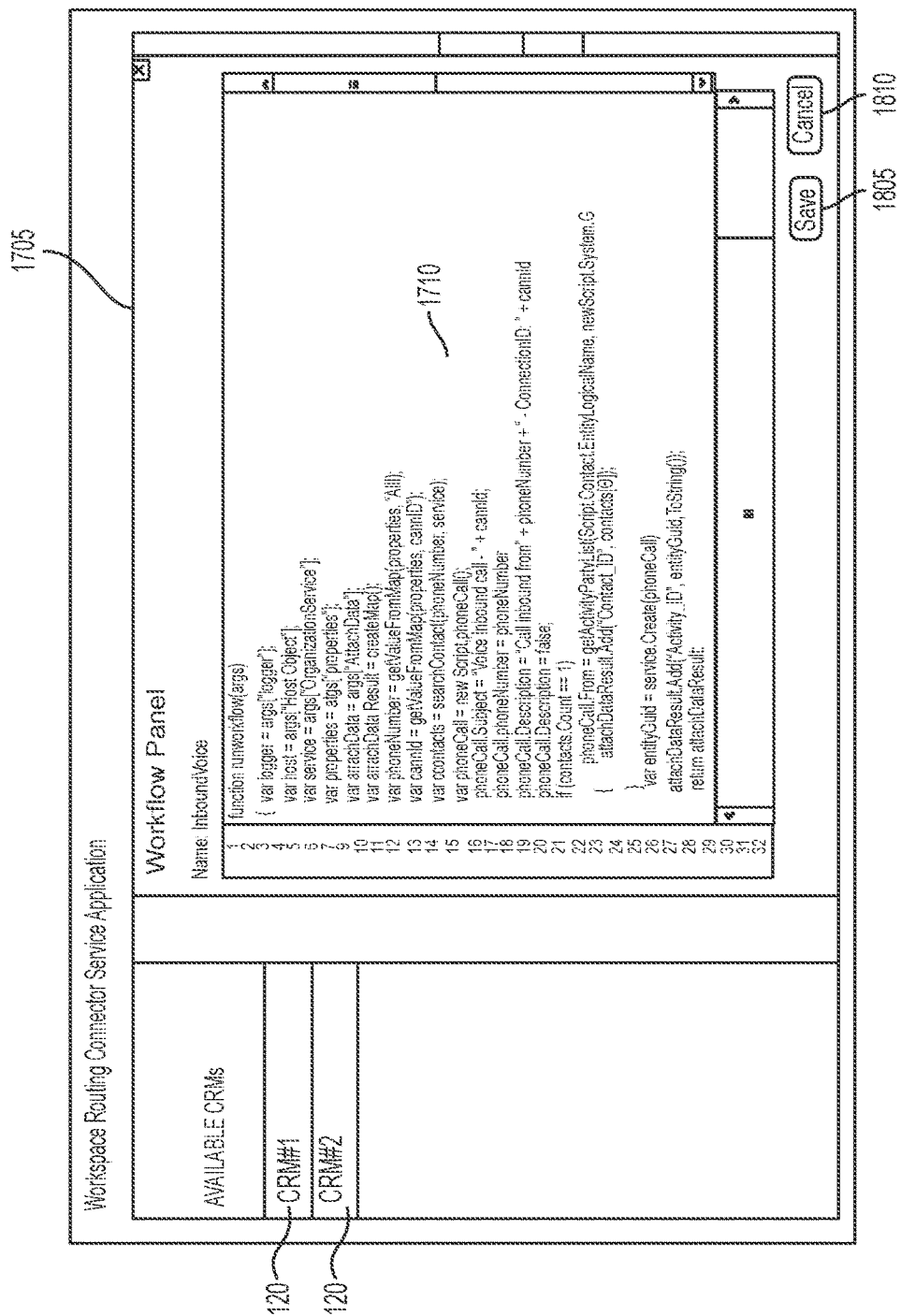
FIG. 18 is a customer relationship management selection window of the workspace routing connector application, according to an illustrative implementation.

FIG. 18 depicts the graphical user interface 1705 subsequent to actuation of the edit button 1715 to select one of the CRM scripts 1710. The CRM script 1710 can include parameters elected by the configuration component 1430. The computing device 1410, responsive to input from the technology administrator for example, can select and edit portions of the CRM script 1710 to obtain new or different information, for example from the contact center enterprise server 1425 for use in the contact center environment 1400 by the enterprise 1405. Edits to the CRM script 1710 can be saved or cancelled by actuation of the save button 1805 or the cancel button 1810.

Figure 19:
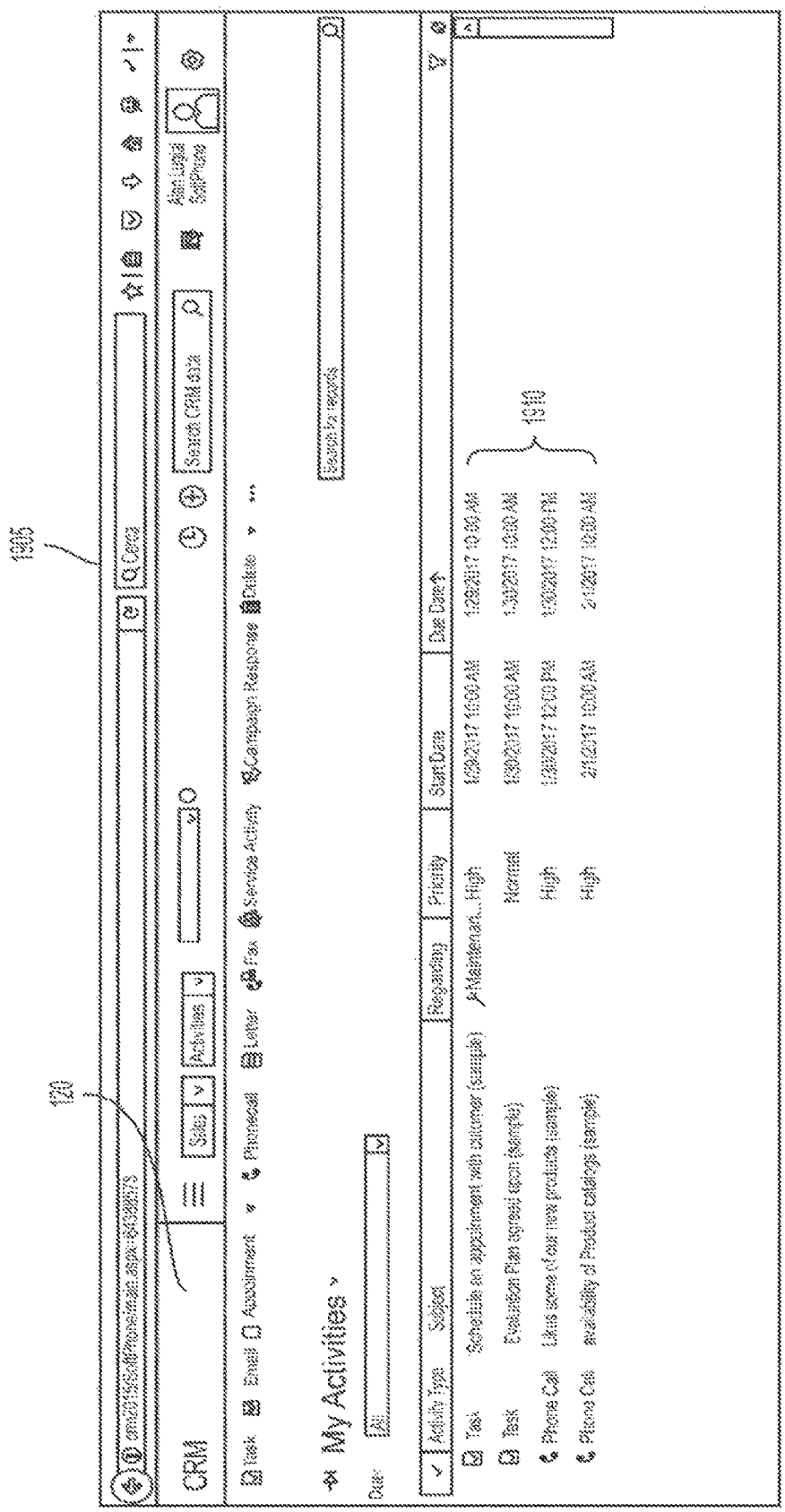
FIG. 19 is a client computing device user interface, according to an illustrative implementation.

FIG. 19 depicts a client computing device user interface 1905 provided at the client computing device 105, e.g., within the user workstation 110. For example, the CRM script 1710 can execute for a CRM application 120 to indicate contact center data 1910. The contact center data 1910 can include information about one or more customers of the enterprise 1405, for example, such as priority levels, subjects, types of activity, start dates, or due dates.

Figure 20:
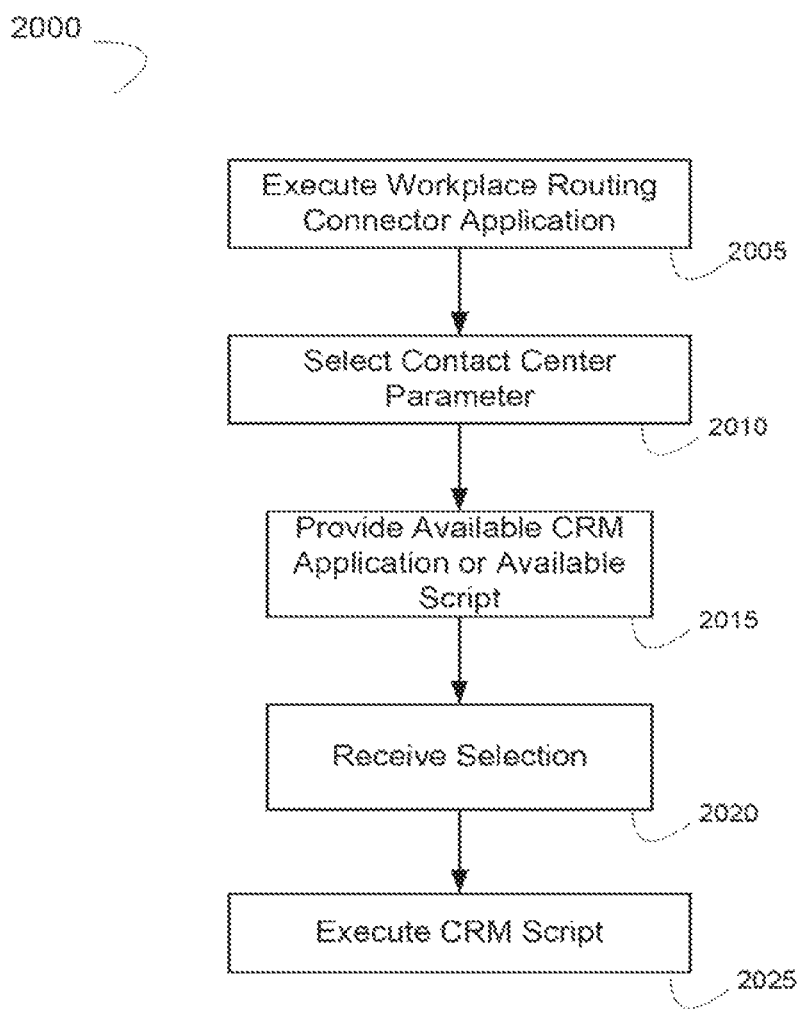
FIG. 20 is a flow diagram depicting a method of contact center data integration with customer relationship management applications, according to an illustrative embodiment.

FIG. 20 depicts a method 2000 of contact center data integration with customer relationship management applications. The method 2000 can include executing the workspace routing connector application 1415 to integrate the contact center enterprise 1420 with the enterprise 1405 (ACT 2005). For example, the workspace routing connector application 1415 can establish a communication session with or obtain data from the contact center enterprise server 1425 or provide the data to the computing device 1410 or the client computing device 105. The workspace routing connector application 1415 can launch or execute (ACT 2005) responsive to an actuation command received, e.g., from the technology administrator via the computing device 1410.

The method 2000 can include selecting at least one contact center parameter (ACT 2010). For example, the configuration component 1430 of the workspace routing connector application 1415 can execute to provide a script for data entry or editing (e.g., by the technology administrator) to select parameters that can be used later to provide contact center data 1910 to the client computing device 105. Based on the contact center parameter, the workspace routing connector application 1415 can provide or indicate at least one of an available CRM application 120 or CRM script 1710 (ACT 2015). Responsive to providing the CRM application 120 or CRM script 1710 for display (ACT 2015), the workspace routing connector application 1415 can receive an indication of a selection of one of the displayed CRM scripts 1710 (or of one of the CRM applications 120) (ACT 2020). Responsive (e.g., subsequent) to the selection, the workspace routing connector application 1415 can execute the CRM script 1710 (ACT 2025). Executing the CRM script (ACT 2020) can cause the workspace routing connector application 1415 or the contact center enterprise server 1425 to provide, via the network 1210, contact center data 1910 (or other contact center data) related to the selected contact center parameter (ACT 2010).

Figure 21:
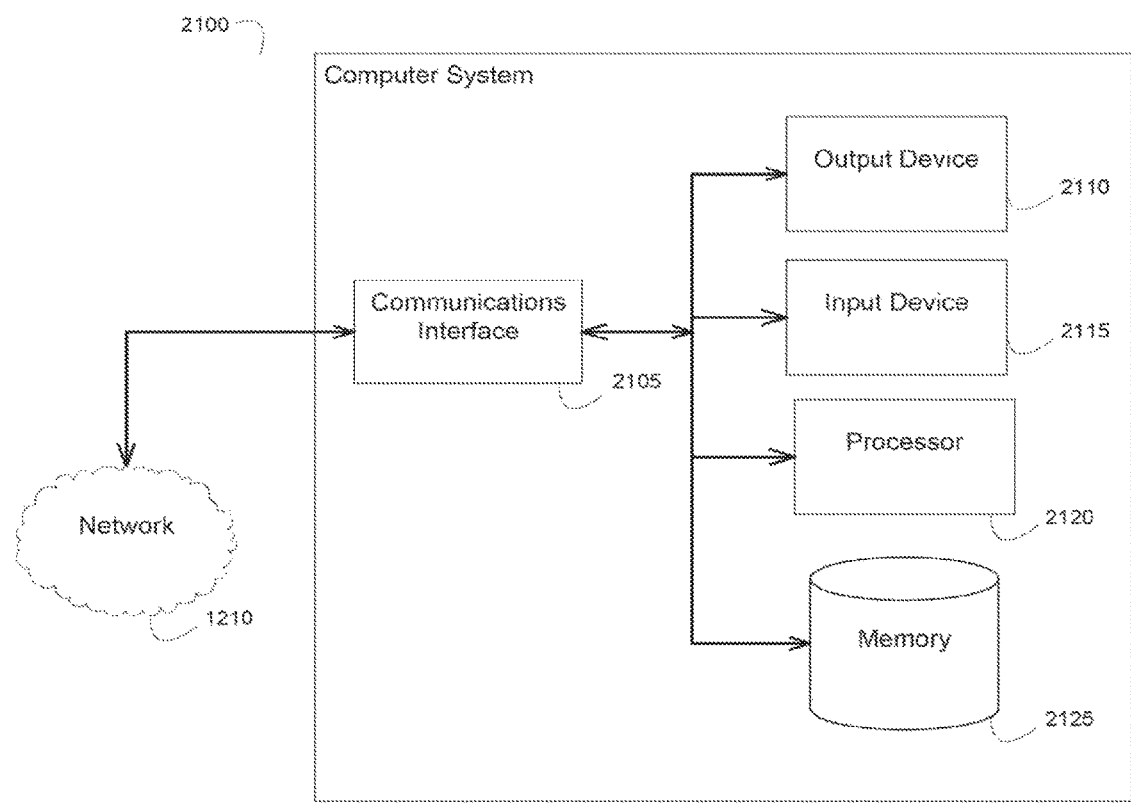
FIG. 21 is a block diagram illustrating a general architecture for a computer system that may be employed to implement elements of the systems and methods described and illustrated herein, according to an illustrative implementation.

FIG. 21 shows the general architecture of an illustrative computer system 2100 that may be employed to implement any of the computer systems discussed herein (including the client computing device 105 and computing device 1410) in accordance with some implementations. The computer system 2100 can be used to provide information via the network 1210, for example to provide data to or from the CRM applications 120, the workspace routing connector application 1415, or the CRM scripts 1710. The computer system 2100 includes one or more processors 2120 communicatively coupled to at least one memory 2125, one or more communications interfaces 2105, and one or more output devices 2110 (e.g., one or more display units) and one or more input devices 2115. The processors 2120 can be included in the client computing device 105, the computing device 1410, or the contact center server 1425, for example.

The memory 2125 can include computer-readable storage media, and can store computer instructions such as processor-executable instructions for implementing the operations described herein. The client computing device 105, the computing device 1410, or the contact center server 1425 can include the memory 2125 to store computer telephone integration data, contact center data, customer or potential data, employee data, or marketing data, for example. The processors 2120 can execute instructions stored in the memory 2125 and can read from or write to the memory information processed and or generated pursuant to execution of the instructions.

The processors 2120 can be communicatively coupled to or control the communications interfaces 2105 to transmit or receive information pursuant to execution of instructions. For example, the communications interfaces 2105 can be coupled to a wired or wireless network, bus, or other communication means and can allow the computer system 2100 to transmit information to or receive information from other devices (e.g., other computer systems). One or more communications interfaces 2105 can facilitate information flow between the components of the client computing device 105. In some implementations, the communications interfaces 2105 can be configured (e.g., via hardware components or software components) to provide a website as an access portal to at least some aspects of the computer system 2100. Examples of communications interfaces 2105 include user interfaces.

The output devices 2110 can allow information to be viewed or perceived in connection with execution of the instructions. The input devices 2115 can allow a user to make manual adjustments, make selections, enter data or other information, or interact in any of a variety of manners with the processor during execution of the instructions.

The systems and methods described herein can integrate CRM applications and other applications in a contact center environment. For example, FIGS. 22-26 among others describe techniques to integrate such applications in a manner that allows at least two of the applications to be displayed simultaneously to a user. The positioning and organization of the two or more applications can be achieved, for example via a script configured to select and implement display settings related to the two or more applications, such that the applications may be displayed with a reduced amount of visual overlap or other visual interference with one another. The script can reside on the client computing device 105 shown in FIG. 1. The script can also reside on a computing device remote from the client computing device 105, such as any of the CRM servers 1205 shown in FIG. 12 or the contact center enterprise server 1425 shown in FIG. 14. Generally, at least two applications can be displayed with substantially no visual overlap so that neither application is shown overlaid on any portion of the other application. Thus, both applications can be viewed or accessed in their entirety simultaneously. At least two applications can also be displayed with partial overlap, and portions of a single application can also be displayed.

Figure 22:
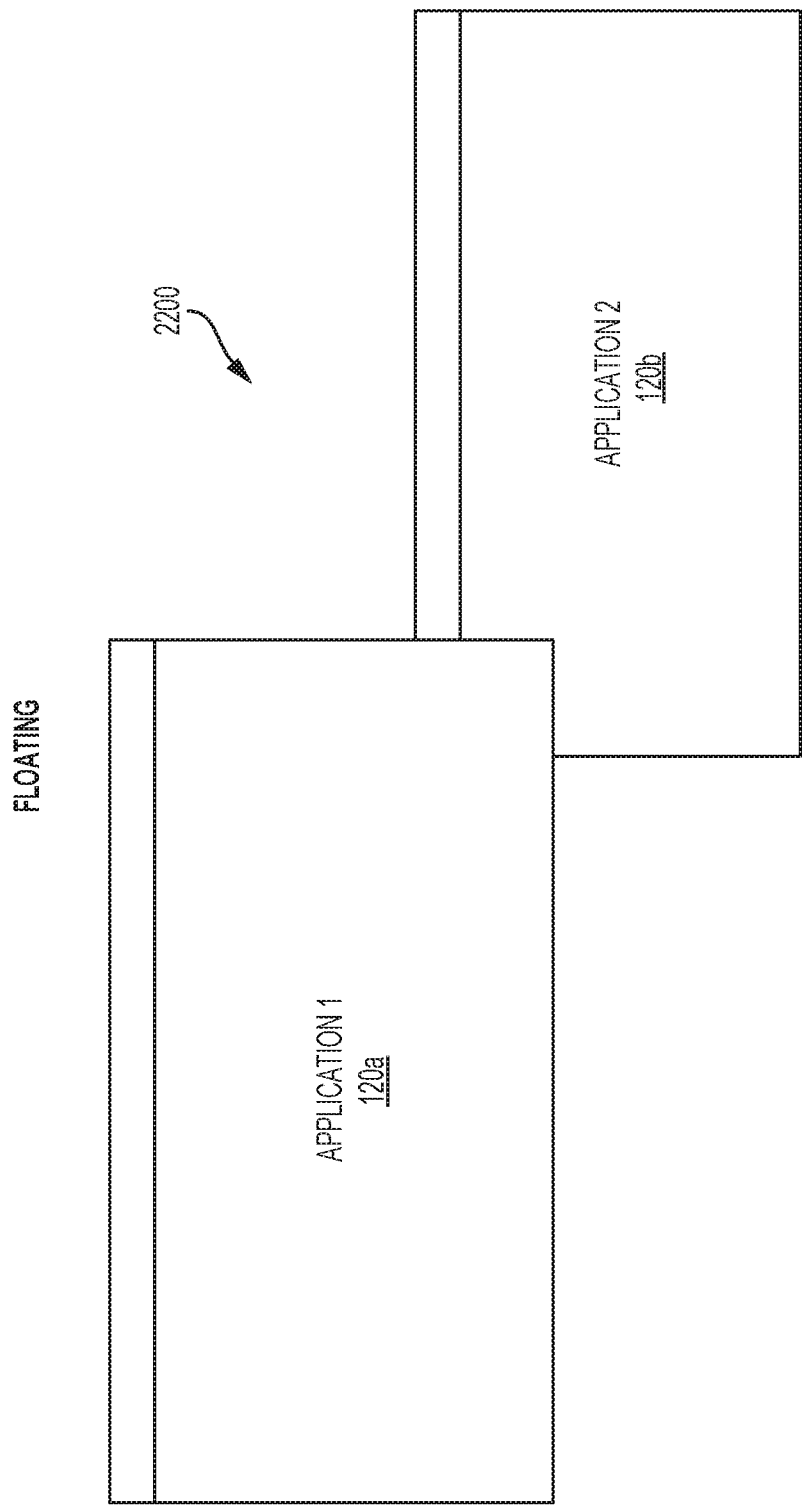
FIG. 22 depicts an example display environment in which two applications are arranged in a floating configuration, according to an illustrative implementation.

FIG. 22 depicts an example display environment 2200 in which two applications 120a and 120b are arranged in a floating configuration. As shown, in the floating configuration a first application 120a at least partially obstructs a second application 120b. The display environment 2200 can be included on a client device, such as the client computing device 105 shown in FIG. 1. While two applications 120a and 120b are shown in FIG. 1, any number of applications may be included (e.g., displayed or partially displayed) within the display environment 2200. In addition, the applications displayed in the environment 2200 can be of any type, and need not necessarily be CRM applications 120 as depicted in FIG. 22.

A toolbar application, such as the toolbar application 115 and one or more CRM applications 120 of FIG. 1, can be provided by different vendors (e.g., different CRM servers 1205). These applications can be integrated with one another via an integration channel such as the integration channel 205 to provide more efficient communications between the different applications at the client computing device 105. This arrangement can allow server-to-server communication to be bypassed, so that communication between the various applications may take place on the client computing device 105. This can save network bandwidth, reduce network transmissions, and save processing and electrical power relative to server-side communications external to the client computing device 105.

Tools provided to agents within the user workstation 110, such as the toolbar application 115 or other applications like the CRM applications 120a and 120b shown in FIG. 22, can be browser-based. Such applications may be displayed simultaneously within a single web browser interface displayed as part of the display environment 2200. Thus, simultaneous or concurrent views or displays of multiple applications (e.g., as windows) may be difficult, as the multiple different applications can overlap one another within the web browser interface. For example, agents at the client computing device 105 can manage the browser based display of CRM or other applications in a multi instance, single view environment whereby a single display can include multiple applications (e.g., displayed within windows), or in a single instance, multi-tab environment where each tab can include one or more applications.

Referring to FIG. 22, for example, applications on a display screen of the client computing device 105 can partially or completely overlap one another, or can otherwise impede access to any one of the applications. This can cause the agent to miss or not see data provided by one or more of the applications that is obstructed, and can require the agent to manually or continuously resize the various applications, click tabs corresponding to the various applications, or scroll through the various applications in order to access the information provided by the applications. For example, FIG. 22 depicts a depicts a floating configuration of application 120a and application 120b, in which an agent may not be able to access information displayed in the portion of application 120b that is visually obstructed by the application 120a. Thus, in this example, the first and second applications 120a and 120b are not equally accessible to the agent at the client computing device 105.

The systems and methods described herein can harmonize or adapt the user interface of the client computing device 105 to react to events from interactions between integrated applications, such as the applications 120a and 120b. For example, the client computing device 105 can execute a script to arrange multiple CRM applications, contact toolbar applications 115, or any other type or form of application for display from the client computing device 105. The script can include script portions for a browser extension or enhanced toolbar. The script can also be executed by at least one computing device remote from the client computing device 105, such as by at least one server of a contact center. The remotely executed script can transmit display instructions from the contact center server to the client computing device 105 in the contact center environment. Examples of different display environments that resolve the issues described above with the floating configuration display environment 2200 are provided in connection with FIGS. 23, 24, and 25, among others.

Figure 23:
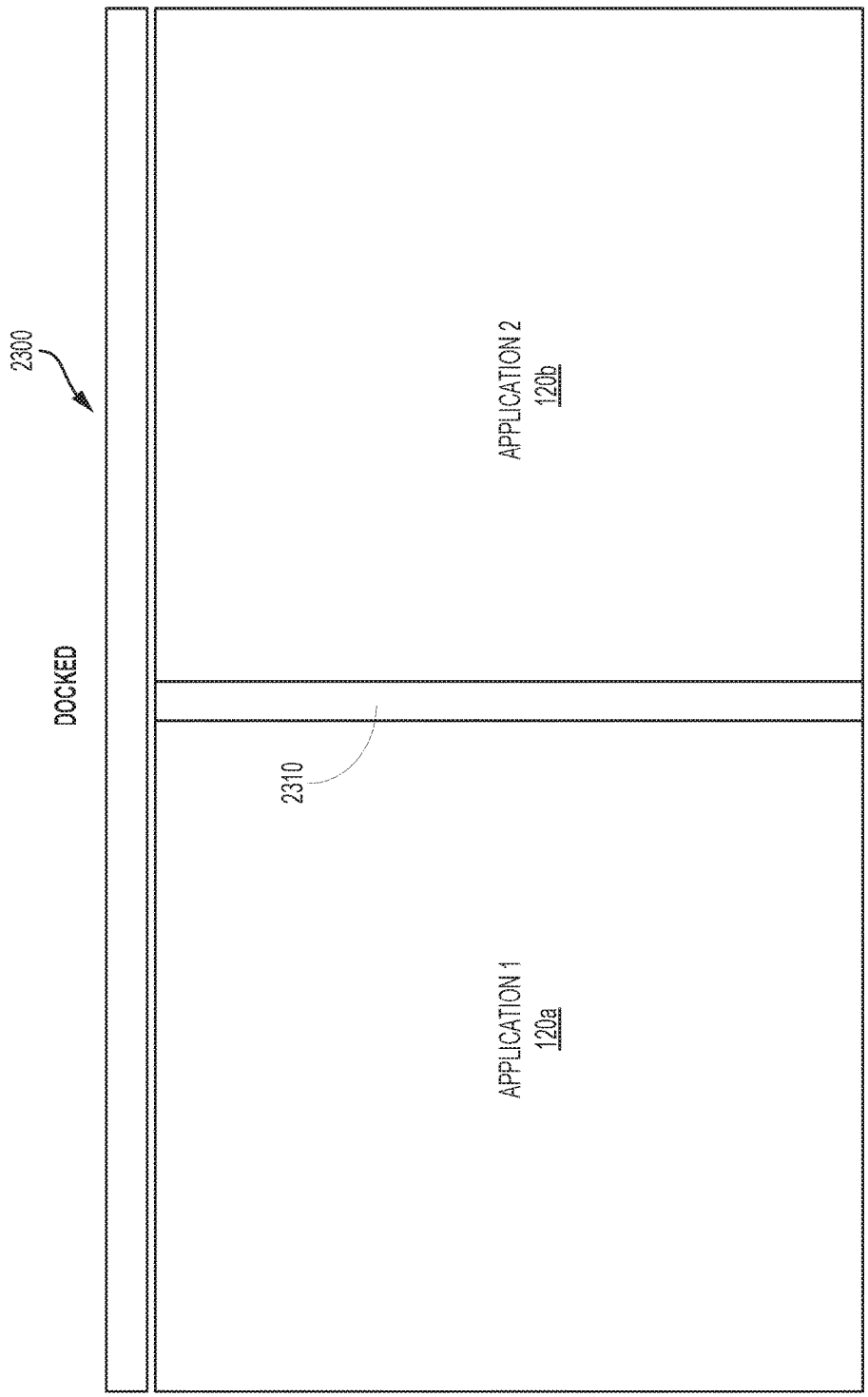
FIG. 23 depicts an example display environment in which two applications are arranged in a docked configuration, according to an illustrative implementation.

FIG. 23 depicts an example display environment 2300 in which two applications 120a and 120b are arranged in a docked configuration. In the docked configuration the two applications 120a and 120b are positioned adjacent to one another, e.g., snapped together in the display environment 2300. The display environment 2300 can be or can include a browser-based display in which both applications 120a and 120b are equally and fully accessible. Generally, an application 120 can be fully accessible if no part of the application is overlapped or obstructed by another application 120. Thus, for an application 120 that is displayed in a respective window, the application 120 is fully accessible if the window for the application 120 is fully viewable and accessible to an agent, and is not obstructed or overlapped by a window of another application 120. In contrast, an arrangement such as the floating arrangement shown in FIG. 22 may not provide for two or more applications 120 to both be fully accessible. For example, the application 120b as shown in FIG. 2 is not fully accessible, because the application 120b is partially obstructed by the application 120a. A boundary region 2310 can be positioned between the two applications. Generally, the boundary region 2310 can be any region separating the application 120a from the application 120b. For example, the boundary region 2310 can be a rectangular region positioned adjacent to the application 120a and the application 120b such that the boundary region 2310 shares at least one border with the application 120a and at least one border with the application 120b. The boundary region 2310 can also be any type of space separating an edge or border of the application 120a from an edge or border of the application 120b. In some implementations, the docket configuration of the environment 2300 may not include the boundary region 2310. For example, a border of the application 120a may be positioned adjacent to a border of the application 120b, with no space or boundary region between them.

The example arrangement of the applications 120a and 120b, as well as the boundary region 2310, as shown in FIG. 23 among others are illustrative, and are not intended to limit the scope of this disclosure. The applications 120a and 120b can be arranged differently while still conforming to a docked configuration. For example, the application 120a can occupy a larger portion of the display environment 2300 than the application 120b. This can be achieved, for example, by displaying the application 120a in a magnified or zoomed manner relative to the application 120b. Thus, while both applications 120a and 120b can still be fully visible and accessible, the first application 120a can be displayed in a larger format than the application 120b. An agent can select the application that is displayed in an enlarged manner.

The applications 120a and 120b can be docked in a vertical fashion (among other configurations), rather than the horizontal fashion shown in FIG. 23. For example, the application 120a can be displayed above the application 120b, with the boundary region 2310 arranged as a horizontal bar between the two applications 120a and 120b. The boundary region can be displayed above, below, or to the side of either of the applications 120a and 120b.

The functionality described herein can be implemented, for example, by a script that constructs an organized display of the applications 120a and 120b in a docked configuration. For example, the script can be similar to that described above in connection with FIG. 22, and may execute as part of a web browser that makes up the display environment 2300 of FIG. 23. The client computing device 105 on which the display environment 2300 is displayed can cause the applications 120a and 120b to be displayed in a docked configuration by other means. For example, a separate standalone application can be used to cause display of the applications 120a and 120b in the docked configuration of FIG. 23. The script or application that causes display of the applications 120a and 120b in the docked configuration can execute on at least one computing device remote from the client computing device 105.

Figure 24:
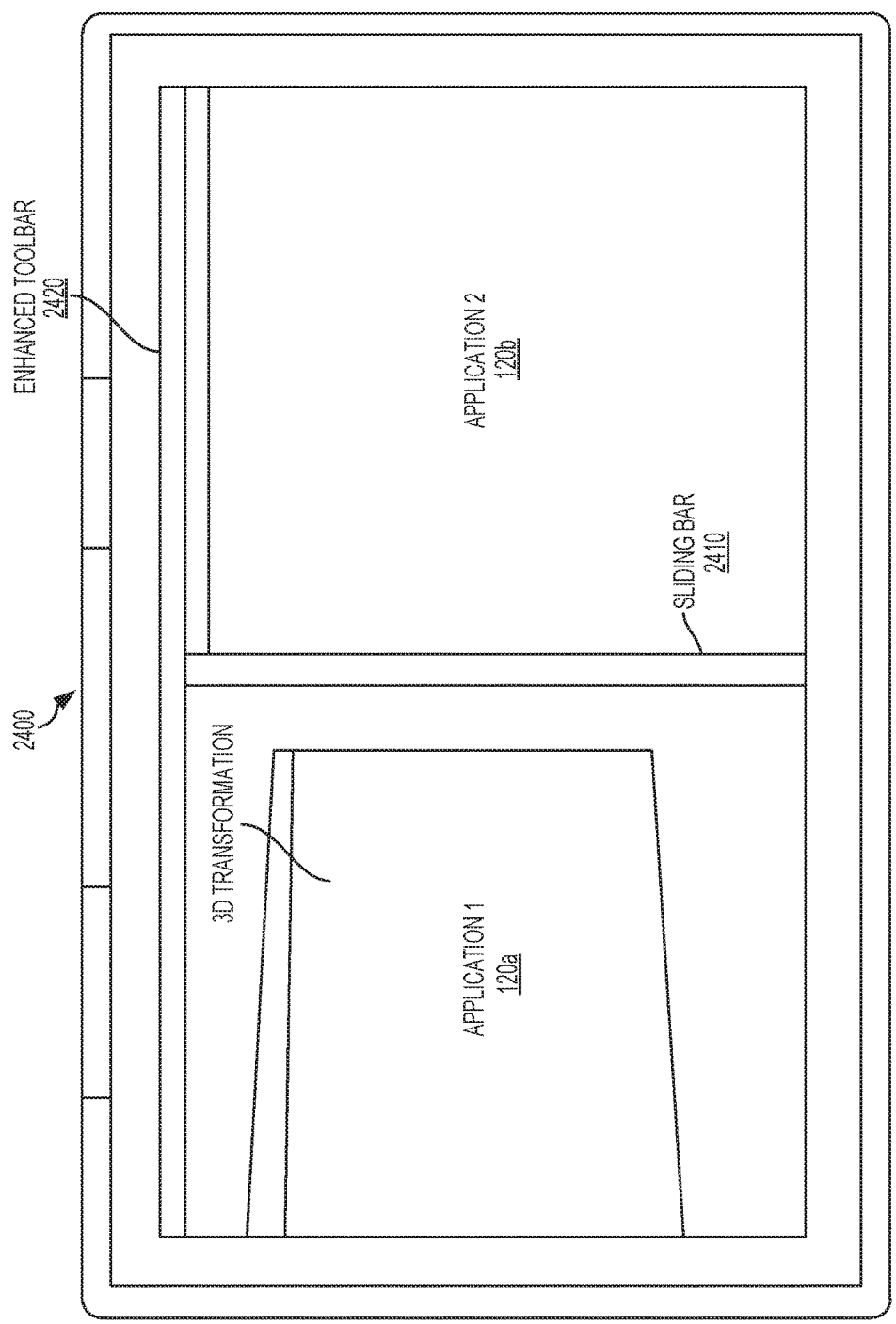
FIG. 24 depicts an example display environment in which two applications are arranged in a three dimensional (3D) configuration, according to an illustrative implementation.

FIG. 24 depicts an example display environment 2400 in which two applications 120a and 120b are displayed in a three dimensional (3D) configuration. In the 3D configuration a sliding bar 2410 is displayed between the two applications 120a and 120b. The sliding bar 2410 can be a display element configured to allow an agent to alter the view of the applications 120a and 120b within the display environment 2400. For example, the sliding bar 2410 can be or can include a user interface element that is selectable via an input device coupled to the client computing device 105, such as a mouse or other pointing device.

Using the input device, the agent can drag or otherwise, slide, or otherwise laterally move the sliding bar 2410 or a portion of the sliding bar 2410 to surface or make available one or more of multiple applications 120*a* and 120*b*. For example, as shown in FIG. 24, the application 120*b* is fully accessible and occupies about half of the display environment 2400, while the application 120*a* is shown partially rotated in a 3D manner such that the application 120*a* occupies a smaller portion of the display environment 2400. An agent can interact with the sliding bar 2410 to further manipulate the arrangement of the applications 120*a* and 120*b*.

For example, the agent can slide the sliding bar 2410 in a first direction (e.g., upwards) to cause the application 120*a* to become further rotated away from the agent. As the application 120*a* rotates further away, it may occupy less space. Simultaneously, the application 120*b* can be enlarged to occupy the space previously occupied by the application 120*a*. In another example, the agent can slide the sliding bar 2410 in a second direction (e.g., downwards) to reverse this process. Sliding the sliding bar 2410 downwards can cause the application 120*b* to rotate away from the agent, and the application 120*a* can be enlarged to occupy the space previously occupied by the application 120*b*. The sliding bar 2410 can have one or more intermediate positions. For example, intermediate positions can allow for both the applications 120*a* and 120*b* to be displayed simultaneously (e.g., at various sizes with respect to one another). The agent can also interact with one or more user input elements included within the enhanced toolbar 2420 to perform similar functionality with respect to resizing, rotating, and arranging the applications 120*a* and 120*b* as desired.

Figure 25:
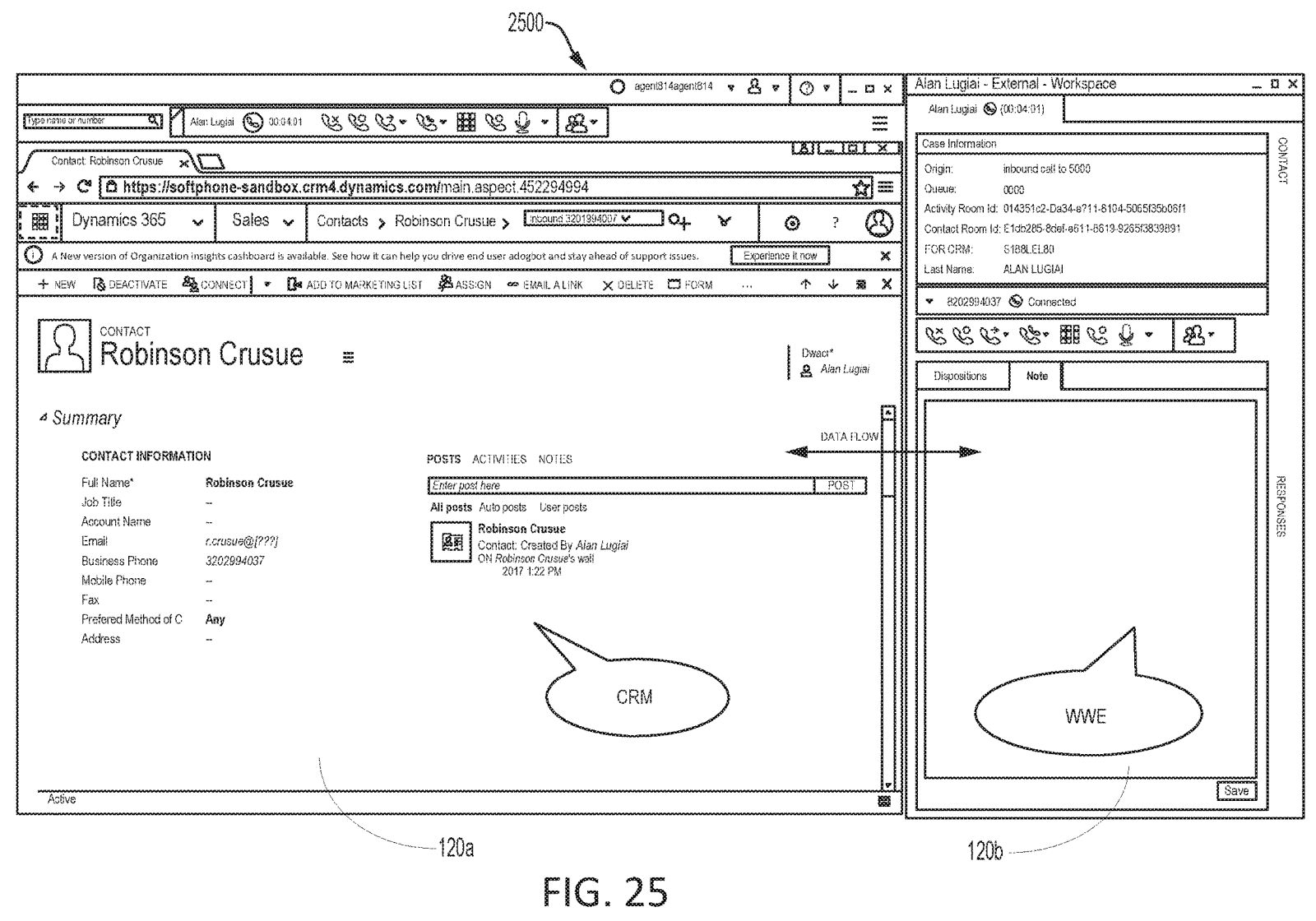

FIG. 25 is a block diagram depicting an example display environment 2500 for client application interaction on a client computing device. In the example display environment 2500, the two applications include a CRM application 120*a* and a workplace application 121 (a Workspace Web Edition or WWE application) are in a docked or adjacent configuration joined together by an enhanced toolbar (e.g., contact toolbar application 115). Data can flow or pass between the integrated applications in the docked or other formats due to the integration. In the examples of FIGS. 23-25, among others, the integrated applications are in a format optimized for agent access and inter-application data transmission, as they are not obstructing one another as in FIG. 22 or otherwise accessible only one at a time.

In this example, as in those described above, the applications displayed can include CRM applications 120, toolbar applications 115, or combinations thereof. These applications can include applications that have been integrated together via the via the integration channel 205. For example, responsive or subsequent to client-side integration of two or more applications for data sharing purposes, a data processing system including at least one processor (e.g., at the client computing device 105 or at a computing device remote from the client computing device 105, such as a remote server), can execute a script or browser extension to determine a display format such as the docked configuration of FIG. 23 or 24, or the 3D configuration of FIG. 24 for the integrated applications. The data processing system can then arrange the applications in the docked, 3D, or other configuration for display by the client computing device 105. Formats other than the docked or 3D formats are also possible. For example the data processing system at or remote from the client computing device 105 can execute the browser extension (or other type of script, application, or enhanced toolbar) to collapse floating or tabbed applications that may obstruct one another, for example as in FIG. 22. The applications can be collapsed or consolidated to any type of display format in which the applications avoid visual interference with one another.

The browser extension (or script, application, or enhanced toolbar) that arranges the integrated applications, e.g., in a non-overlapping display for simultaneous viewing or access, can control layout of one or more applications on the client computing device 105 (e.g., within the user workstation 110) to increase accessibility to the applications or to increase the amount of displayed data visible to the agent at the client computing device 105. Multiple applications (e.g., CRM applications 120) can be embedded within the browser extension or the user workstation 110 that can execute the browser extension. The script or browser extension can also provide additional controls (such as a menu to select an application display format) to the agent at the client computing device 105.

Such a script or browser extension can automatically collapse or format the display of multiple applications in an improved or optimized layout responsive to integration of the applications, or responsive to an input format command received from the agent via the toolbar application of client computing device 105. For example, multiple integrated CRM applications 120 or other applications can be connected to one another (e.g., integrated on the client side at the client computing device 105 using a connector application or connection point 130) as described above. Based on the types of integrated or connected applications or the data included within those applications, the script, application, browser extension, or enhanced toolbar can interact with the user interface to hide, resize, move, consolidate, collapse, merge, or dock together two or more of the integrated applications in any suitable fashion. This behavior-driven user interface can improve or optimize the layout of multiple integrated applications (e.g., as in FIGS. 23-25), by increasing access or decreasing the amount of manipulation required to toggle between integrated applications relative for example to the floating configuration of FIG. 22. An agent can have partial or full control over the consolidated layout of the applications. For example, one or more user interface elements such as the sliding bar 2410 shown in FIG. 24 can allow the agent to select a desired format for the display of two or more applications. The agent may also be able to change the display format at a later time using the one or more user interface elements.

Thus, the script, browser extension, application, or enhanced toolbar can provide an adaptive user interface to improve the display layout of two or more applications. Such an adaptive user interface can adapt to various screen resolutions such as wide screens, and may be compliant with multi-screen workstations as well. For example, the script, browser extension, application, or enhanced toolbar that provides the adaptive user interface can determine a resolution of a monitor on which two or more applications are displayed. The script, browser extension, application, or enhanced toolbar can also determine a number of monitors used to display the one or more applications. The script, browser extension, application, or enhanced toolbar can then select an arrangement for the two or more applications based on the number of monitors and their respective resolutions. For example, if two applications are to be displayed and two monitors are used to display the applications, the script, browser extension, application, or enhanced toolbar (or combinations thereof) can determine that a first monitor should be used to display a first one of the applications, and a second monitor should be used to display a second one of the applications. Thus, the systems and methods described herein can extend or expand a web browser by providing a browser extension to control the format or display of integrated applications displayed on a user interface. The browser extension can include a script that is plugged into a web browser that can react to user events, add services, and manage the user interface.

Figure 26:
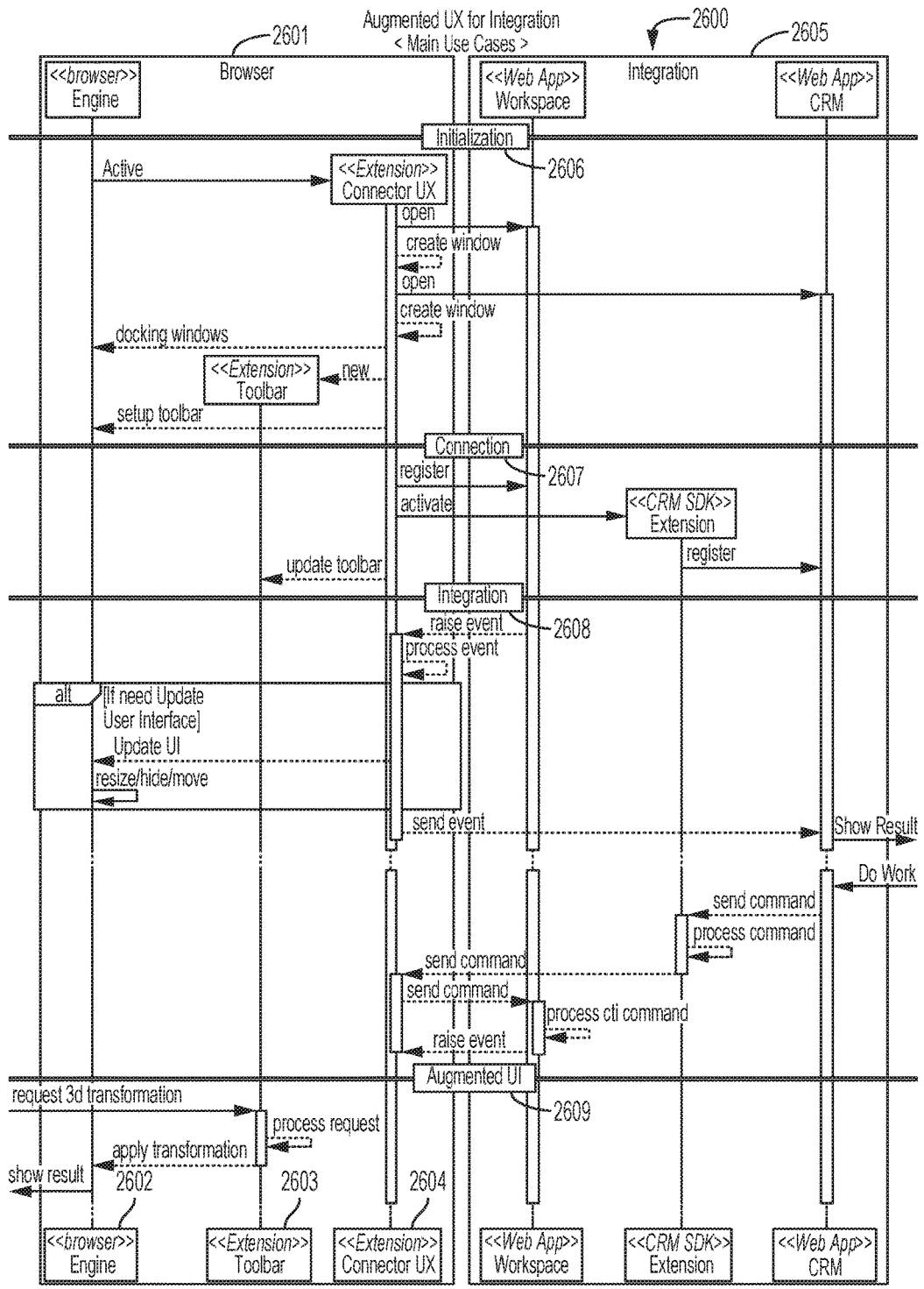
FIG. 26 is a sequence diagram depicting the flow of information in one example environment for client application interaction on a client computing device, according to an illustrative implementation.

FIG. 26 is a sequence diagram depicting the flow of information in one example environment 2600 for client application interaction on a client computing device. In FIG. 26, information flows between components of a browser domain 260a and an integration domain 2605. In some arrangements, the browser domain 2601 can include a single browser instance and can also include a browser application or engine 2602, browser extension or plugin 2603, and connector extension or plugin 2604. The integration domain 2605 can include the web applications that can be integrated to control layouts or formats of applications by the client computing device 105 and to allow communications between these applications.

FIG. 26 depicts an initialization scenario 2606, a connection scenario 2607, an integration scenario 2608, and an augmented user interface scenario 2609. The initialization scenario 2606 depicts actions undertaken in the environment 2600 (e.g., by the client computing device 105 or other contact center computing device) to set up the integrated application formats described herein (e.g., FIGS. 23-25). The browser can activate the browser extension script or plugin that can open external applications (e.g., CRM applications 120) to integrate and dock them (or arrange them in other formats, as described above). The initialization scenario 2606 also creates a toolbar and attaches it to the browser. In the connection scenario 2607, the connector UX can register itself on the integrated applications to enable communication between them. For example, each integrated application can include a respective connection point (such as the connection point 130 shown in FIG. 1). The connector UX can register itself on the integrated applications via these connection points. Generally, this registration can allow the connector UX and the integrated applications to access one another.

The connector UX can also activate the CRM software development kit (SDK). The CRM SDK can facilitate communication between the connector UX and an application, such as the CRM application 120. The CRM SDK can be installed (or can otherwise reside) within a CRM web app that executes within the browser. The CRM SDK can be a programmable component of the connector UX, which can allow for at least some functionality of the CRM application to be controlled. The CRM SDK can make different CRM application behaviors compliant for integration and formatting with other applications. In the integration scenario 2608, the browser extension can handle events from the CRM or other applications. Operations labeled "alt" in FIG. 26 can be optionally performed in the integration scenario 2608, and can relate to modifying or altering an appearance of the web browser or an application executing within the web browser. For example, an event received from the integration domain 2605 in the integration phase 2608 can correspond to maximizing, minimizing, hiding, moving, resizing, or otherwise changing a visual appearance of the web browser or an application executing within the web browser, and the connector UX can handle the event by changing the visual appearance of the web browser or an application executing within the web browser accordingly.

For example if the events imply a user interface modification the browser extension (or other script) can inform the browser engine of what updates are needed or recommended, creating a behavior driven user interface. Generally, a respective event can be raised in the integration phase 2608 for each respective contact request received from a customer. For example, a contact request may include a phone call, an email, a text message, or a chat request from a customer. Thus, events occurring within the integration phase 2608 can generally correspond to actions performed by customers initiating contact with an agent. Commands in the integration phase 2608 can correspond to any operations performed by an agent. For example, commands may correspond to an agent closing a customer request, escalating a customer request, interacting with a client to handle the client's request, or entering a note relating to a client request. Thus, commands occurring within the integration phase 2608 can generally correspond to actions performed by an agent to manager customer communications.

The augmented user interface scenario 2609 can transform the integrated applications to provide the docked, 3D, or other layout or format to the integrated applications, which can then be provided for display by the client computing device 105 to the agent. For example, in some implementations, the applications can be visually transformed automatically by the extension toolbar (or other script or application), based on the characteristics of one or more monitors used to display the applications. In some implementations, the applications can be transformed based in part on user input received from an agent. For example, as described above, a user interface element (such as the sliding bar 2410 shown in FIG. 24) can be provided to allow a user to configure the visual arrangement of applications, and the extension toolbar can apply visual transformations based on the agent's interaction with such a user interface element.

Referring to FIGS. 1-26, the environment 1400 and environment 100 can include a contact center environment such as a call center having a plurality of client computing devices 105. The client computing devices 105 in the contact center environment can include at least one user workstation 110, at least one contact toolbar application 115, at least one CRM application 120, at least one master connector plugin 125, and at least one connector plugins 135. The contact toolbar application 115, the CRM applications 120 and their plugins or other components can provide computer telephony integration data for display in one or more user interfaces of the client computing device 105. Computing devices of the enterprise 1405 or the contact center enterprise 1425, or third parties, can include servers or other computing devices that include the workspace routing connector application 1415.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing system" or "computing device" "module" "engine" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The client computing device 105 or the computing device 1410, among others, can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the client computing device 105 or computing device 1410) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the environment 100 or environment 1400 can include clients and servers. A client and server are generally remote from each other and typically interact through a communication network (e.g., the network 1210). The relationship of client and server arises by virtue of computer programs running on the respective computers and having a client-server relationship to each other. Data generated at the client device (e.g., a result of the user interaction) can be received from the client device at the server (e.g., received by the client computing device 105 of the computing device 1410 from the workspace routing connector application 1415 from the CRM server 1205).

Systems and methods described herein relate to contact center management. Integrated CRM (or other) applications can be provided for display from the client computing device 105 to contact center agents (an end user or operator) who can manage end user (customer) contact or other information. For example, the user workstation 110 can include at least one contact toolbar application 115 and at least one CRM application 120 that can be displayed by the client computing device 105. The contact toolbar application 115 concerns the management of a channel (e.g., integration channel 205) via which customers can perform their requests, and the CRM application(s) 120 can be used by agents to manage customer information or provide customized or tailored support or assistance.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the environment 100, environment 1400, or the client computing device 105, computing device 1410, or contact center enterprise server 1425 can be a single module or a logic device having one or more processing circuits.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the CRM applications 120 can include or be wired for management (WFM) or enterprise resource planning (EFP) computer system management applications. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to provide computer telephony integration between customer relationship management (CRM) applications on client computing devices in a contact center environment, comprising:
   a client computing device in the contact center environment, the client computing device including a processor and memory;
   the client computing device having a user workstation including a contact toolbar application and a CRM application to provide computer telephony integration data for display by the client computing device;
   the contact toolbar application that executes on the client computing device to provide a connection point within the user workstation, the connection point including at least one of a hypertext transfer protocol (HTTP) endpoint and an internet address; and
   the user workstation that establishes an integration channel over a data network via the connection point between the contact toolbar application and the CRM application for real time exchange of the computer telephony integration data between the contact toolbar application and the CRM application.

2. The system of claim 1, wherein:
the client computing device executes a connector plugin of the CRM application to identify the connection point and to establish a connection with the connection point.

3. The system of claim 1, wherein:
the user workstation is configured to provide a concurrent display of the contact toolbar application with the CRM application.

4. The system of claim 1, wherein:
the user workstation is configured to provide a concurrent display of the CRM application with a second CRM application.

5. The system of claim 1, comprising:
a script to provide a concurrent display of the CRM application with a second CRM application, wherein the script comprises a browser extension to provide the concurrent display of the CRM application with the second CRM application within a web browser interface.

6. The system of claim 1, comprising:
a script to provide a concurrent display of the CRM application with a second CRM application, wherein the script comprises a browser extension to provide the concurrent display of the CRM application with the second CRM application within a web browser interface, wherein:
a browser associated with the web browser interface executes a connector user interface to activate a CRM software development kit (SDK).

7. The system of claim 6, comprising:
the CRM SDK configured to provide for communication between the connector user interface and each of the CRM application and the second CRM application.

8. The system of claim 1, comprising:
a script to provide a concurrent display of the CRM application with a second CRM application, wherein:
   the script is executed by at least one server remote from the client computing device; and
   the script provides display instructions to the client computing device to cause the concurrent display of the CRM application with the second CRM application on the client computing device.

9. The system of claim 1, comprising:
a script to provide a concurrent display of the CRM application with a second CRM application, wherein the script is configured to:
   select a display format, from among a plurality of available display formats, for the concurrent display of the CRM application with the second CRM application; and cause the CRM application and the second CRM application to be displayed according to the selected display format.

10. The system of claim 9, wherein:
the selected display format comprises a docked configuration in which the CRM application and the second CRM application are displayed side by side within a web browser, such that both the CRM application and the second CRM application are fully accessible simultaneously.

11. The system of claim 9, wherein:
the selected display format comprises a 3D configuration in which the CRM application and the second CRM application are represented in a three-dimensional manner within a web browser along with a sliding interface element configured to be arranged in a first position to make available the CRM application and to be arranged in a second position to make available the second CRM application.

12. The system of claim 1, wherein:
the user workstation executes a second CRM application to display concurrently with the CRM application; and
the user workstation comprises an adaptive display to display the CRM application and the second CRM application, the adaptive display configured to adapt to a plurality of screen resolutions of the client computing device.

13. The system of claim 1, comprising:
a script to:
provide a concurrent display of the CRM application with a second CRM application; and
provide a menu including two or more menu options each corresponding to a respective display format for the CRM application and the second CRM application.

14. The system of claim 1, wherein:
the user workstation executes a second CRM application displayed concurrently with the CRM application; and
the user workstation establishes the integration channel for real time exchange of the computer telephony integration data between the CRM application and the second CRM application.

15. A method of providing computer telephony integration between customer relationship management (CRM) applications on client computing devices in a contact center environment, comprising:
executing, by a client computing device having a user workstation in the contact center environment, a contact toolbar application and a CRM application to provide computer telephony integration data for display by the client computing device;

providing, by the contact toolbar application, a connection point within the user workstation, the connection point including at least one of a hypertext transfer protocol (HTTP) endpoint and an internet address; and
establishing, by the user workstation, an integration channel over a data network via the connection point between the contact toolbar application and the CRM application for real time exchange of the computer telephony integration data between the contact toolbar application and the CRM application.

16. The method of claim 15, comprising:
providing, by a script, a concurrent display of the CRM application with a second CRM application, wherein the script comprises a browser extension to provide the concurrent display of the CRM application with the second CRM application within a web browser interface.

17. The method of claim 16, comprising:
executing, by a web browser application running on the client computing device, a connector user interface to activate a CRM software development kit (SDK) configured to provide communication between the connector user interface and each of the CRM application and the second CRM application.

18. The method of claim 15, comprising:
providing, by a script, a concurrent display of the CRM application with a second CRM application;
selecting, by the script, a display format from among a plurality of available display formats, for the concurrent display of the CRM application with the second CRM application; and
causing, by the script, the CRM application and the second CRM application to be displayed according to the selected display format.

19. The method of claim 18, wherein:
the selected display format comprises a docked configuration in which the CRM application and the second CRM application are displayed side by side within a web browser, such that both the CRM application and the second CRM application are fully accessible simultaneously.

20. The method of claim 18, wherein:
the selected display format comprises a 3D configuration in which the CRM application and the second CRM application are represented in a three-dimensional manner within a web browser along with a sliding interface element configured to be positioned in a first position to make available the CRM application and to be positioned in a second position to make available the second CRM application.

* * * * *